United States Patent
Yang et al.

(10) Patent No.: US 10,290,063 B2
(45) Date of Patent: May 14, 2019

(54) SYSTEM AND METHOD FOR INSTANTANEOUS POWER DECOMPOSITION AND ESTIMATION

(71) Applicant: EATON CORPORATION, Cleveland, OH (US)

(72) Inventors: Yi Yang, Milwaukee, WI (US); Liang Du, Atlanta, GA (US); Dawei He, Beijing (CN)

(73) Assignee: UNITED STATES DEPARTMENT OF ENERGY, Washington, DC (US)

( * ) Notice: Subject to any disclaimer, the term of this patent is extended or adjusted under 35 U.S.C. 154(b) by 1624 days.

(21) Appl. No.: 13/920,602

(22) Filed: Jun. 18, 2013

(65) Prior Publication Data

US 2014/0371932 A1    Dec. 18, 2014

(51) Int. Cl.
*G06Q 50/06* (2012.01)
*G01D 4/00* (2006.01)

(52) U.S. Cl.
CPC .............. *G06Q 50/06* (2013.01); *G01D 4/00* (2013.01); *Y04S 20/38* (2013.01)

(58) Field of Classification Search
CPC ........ Y04S 20/38; Y04S 20/16; Y04S 20/242; Y04S 20/222; H02J 3/14; H02J 13/0062; G01D 4/002; G01R 1/00; G01R 21/133; H02H 1/00; Y02B 70/3225; Y02B 70/3266

(Continued)

(56) References Cited

U.S. PATENT DOCUMENTS

| | | |
|---|---|---|
| 4,858,141 A | 8/1989 | Hart et al. |
| 5,483,153 A | 1/1996 | Leeb et al. |

(Continued)

FOREIGN PATENT DOCUMENTS

| | | |
|---|---|---|
| EP | 2 570 775 A1 | 3/2013 |
| GB | 2465367 A | 5/2010 |
| WO | 2010/005985 A1 | 1/2010 |

OTHER PUBLICATIONS

European Patent Office, "International Search Report and Written Opinion", dated Sep. 19, 2014, 9 pp.

(Continued)

*Primary Examiner* — John E Breene
*Assistant Examiner* — Jeffrey P Aiello
(74) *Attorney, Agent, or Firm* — Eckert Seamans

(57) ABSTRACT

A system disaggregates and estimates power consumption of electric loads powered by a single electrical outlet. The system includes a processor having a routine; a current sensor cooperating with the processor to measure samples for one line cycle of an aggregated current waveform for the electric loads powered by the single electrical outlet; and a voltage sensor cooperating with the processor to measure samples for the one line cycle of a voltage waveform for the electric loads powered by the single electrical outlet. The processor routine transfers the measured samples for the one line cycle of the aggregated current waveform and the voltage waveform into an aggregated voltage-current trajectory for the single electrical outlet, and provides an instantaneous decomposition of power consumption for a plurality of different categories of the electric loads from the aggregated voltage-current trajectory for the one line cycle.

23 Claims, 19 Drawing Sheets

(58) Field of Classification Search
USPC ......... 307/112, 35, 39; 361/622; 702/60, 61, 702/62; 700/295
See application file for complete search history.

(56) References Cited

U.S. PATENT DOCUMENTS

| | | | |
|---|---|---|---|
| 5,717,325 A | | 2/1998 | Leeb et al. |
| 5,736,936 A | * | 4/1998 | Bombay ............... G01R 19/04 324/543 |
| 5,910,875 A | | 6/1999 | Tian et al. |
| 5,910,892 A | * | 6/1999 | Lyons .................. H02M 7/487 363/132 |
| 6,081,123 A | | 6/2000 | Kasbarian et al. |
| 2009/0072985 A1 | | 3/2009 | Patel et al. |
| 2010/0017186 A1 | * | 1/2010 | Kim ................... G06F 17/5036 703/14 |
| 2010/0295540 A1 | * | 11/2010 | Bowman ............. G01R 22/061 324/127 |
| 2011/0184560 A1 | * | 7/2011 | Brickell ................. B66C 13/16 700/275 |
| 2011/0301894 A1 | | 12/2011 | Sanderford, Jr. |
| 2012/0173174 A1 | * | 7/2012 | Gaarder ............... G01R 31/086 702/58 |
| 2013/0066479 A1 | * | 3/2013 | Shetty .................... G01D 4/002 700/295 |
| 2013/0138651 A1 | | 5/2013 | Lu et al. |
| 2013/0138661 A1 | * | 5/2013 | Lu .......................... G06N 7/00 707/748 |
| 2013/0138669 A1 | | 5/2013 | Lu et al. |
| 2013/0211751 A1 | * | 8/2013 | Park ....................... G01R 21/06 702/61 |
| 2013/0238266 A1 | * | 9/2013 | Savvides ............... G06Q 50/06 702/61 |
| 2013/0304266 A1 | * | 11/2013 | Giannakis ............ G01R 21/133 700/286 |
| 2013/0338948 A1 | * | 12/2013 | Zeifman ................ G01D 4/002 702/60 |
| 2014/0207398 A1 | * | 7/2014 | Lai ......................... G01D 4/00 702/61 |
| 2014/0336960 A1 | * | 11/2014 | Haghighat-Kashani .................... G06Q 10/04 702/60 |

OTHER PUBLICATIONS

A. Bouloutas et al., "Fault Identification Using a Finite State Machine Model with Unreliable Partially Observed Data Sequences", IEEE Transactions on Communications, vol. 41, No. 7, Jul. 1993, pp. 1074-1083.

G. Hart et al., "Correcting Dependent Errors in Sequences Generated by Finite-State Processes", IEEE Transactions on Information Theory, vol. 39, No. 4, Jul. 1993, pp. 1249-1260.

Y. Du et al., "A Review of Identification and Monitoring Methods for Electric Loads in Commercial and Residential Buildings", Proc. 2010 IEEE Energy Conversion Conf. and Expo., Atlanta, GA, 2010, pp. 4527-4533.

H. Chang et al., "Load Recognition for Different Loads with the Same Real Power and Reactive Power in a Non-intrusive Load-monitoring System," Computer Supported Cooperative Work in Design, 2008 IEEE, pp. 1122-1127.

H. Chiang et al., "Optimal Capacitor Placements in Distribution Systems: Part 1: A New Formulation and the Overall Problem," IEEE Transactions on Power Delivery, vol. 5, No. 2, Apr. 1990, pp. 634-642.

TIAX LLC, "Commercial and Residential Sector Miscellaneous Electricity Consumption: Y2005 and Projections to 2030," Sep. 22, 2006, 97 pp.

L. Yee, "Voltage-Current Trajectory: A 2-Dimensional Approach to Understand Electrical Load Signatures", Abstract of Thesis, The University of Hong Kong, May 2007, 121 pp.

H. Lam et al., "A Novel Method to Construct Taxonomy Electrical Appliances Based on Load Signatures," IEEE Transactions on Consumer Electronics, vol. 53, No. 2, 2007, pp. 653-660.

C. Laughman et al., "Power Signature Analysis," IEEE Power & Energy Magazine, vol. 2, Mar./Apr. 2003, pp. 56-63.

T. Saitoh et al., "Current Sensor based Non-intrusive Appliance Recognition for Intelligent Outlet," 23rd International Technical Conference on Circuits/Systems, Computers and Communications, 2008, pp. 349-352.

S. Burdett et al., "A Study of Power Factor Correction Techniques for High Power AC Locomotives," International Conference on Main Line Railway Electrification, 1989, pp. 363-367.

F. Sultanem et al., "Using Appliance Signatures for Monitoring Residential Loads at Meter Panel Level," IEEE Transaction on Power Delivery, vol. 6, No. 4, Oct. 1991, pp. 1380-1385.

K. Suzuki et al., "Nonintrusive Appliance Load Monitoring Based on Integer Programming," SICE Annual Conference, 2008, pp. 2742-2747.

W. Chan et al., "Harmonics Load Signature Recognition by Wavelets Transforms," International Conference on Electric Utility Deregulation and Restructuring and Power Technologies, 2000, pp. 666-671.

A. Cole et al., "Nonintrusive Identification of Electrical Loads in a Three-phase Environment Based on Harmonic Content," Proc. 17th IEEE Instrumentation and Measurement Technology Conf., 2000, pp. 24-29.

U.S. Energy Information Administration, "Annual Energy Review 2011," U.S. Department of Energy, Washington DC, DOE/EIA-0384(2011), Sep. 2012, 390 pp.

D. He et al., "Front-End Electronic Circuit Topology Analysis for Model-Driven Classification and Monitoring of Appliance Loads in Smart Buildings," IEEE Transactions on Smart Grid, vol. 3, No. 4, Dec. 2012, pp. 2286-2293.

Lawrence Berkeley National Laboratory, "Standby Power", http://standby.lbl.gov, 2013, 1 p.

K. McKenney et al., "Commercial Miscellaneous Electric Loads: Energy Consumption Characterization and Savings Potential in 2008 by Building Type", TIAX LLC, Ref. No. D0498, May 2010, 224 pp.

G. Hart, "Nonintrusive appliance load monitoring", Proceedings of the IEEE, vol. 80, No. 12, Dec. 1992, pp. 1870-1891.

J. Liang et al., "Load Signature Study—Part I: Basic Concept, Structure, and Methodology", IEEE Transactions on Power Delivery, vol. 25, No. 2, Apr. 2010, pp. 551-560.

C. Barley et al., "Building America System Research Plan for Reduction of Miscellaneous Electrical Loads in Zero Energy Homes", National Renewable Energy Laboratory, Technical Report, NREL/TP-550-43718, Nov. 2008, 39 pp.

R. Hendron et al., "Development of an Energy-Savings Calculation Methodology for Residential Miscellaneous Electric Loads", National Renewable Energy Laboratory, Conference Paper, NREL/CP-550-39551, Aug. 2006, 15 pp.

S. Drenker et al., "Nonintrusive Monitoring of Electric Loads", IEEE Computer Applications in Power, Oct. 1999, pp. 47-51.

* cited by examiner

SYSTEM AND METHOD FOR INSTANTANEOUS POWER DECOMPOSITION AND ESTIMATION

This invention was made with Government support under DE-EE0003911 awarded by the Department of Energy National Energy Technology Laboratory. The Government has certain rights in this invention.

BACKGROUND

Field

The disclosed concept pertains generally to electric loads and, more particularly, to methods of determining power consumption thereof. The disclosed concept also pertains to systems for determining power consumption of electric loads.

Background Information

Of the primary electricity used by commercial buildings, about 37% is consumed by plug-in electric loads (PELs), also known as miscellaneous electric loads (MELs). This use is expected to grow by 78% between 2008 and 2030. PELs are defined as all non-mains connected electric loads in a building and include a variety of electrical devices such as, for example and without limitation, refrigerators, computers, food preparation appliances and space heaters/fans. The total energy consumption of these "plug-in" devices is often overlooked.

Several studies indicate that an effective management of PELs could potentially improve energy savings of buildings by up to about 10% to 30% of their usage. However, the development of widely applicable energy saving solutions for PELs is difficult mainly because of the limited visibility of PELs' energy usage in today's buildings. Knowing the energy consumption by types and categories of PELs is needed to overcome the above difficulties. Thus, developing a cost-effective, nonintrusive appliance load monitoring and identification technology at the load level (also known as the "appliance-level") is desired.

In buildings, electric power can be supplied to a PEL directly through a wall outlet, or through a power strip that is plugged into a wall outlet in order to distribute power to multiple outlets of the power strip. The latter scenario is more commonly adopted by users to enable the wall outlet to simultaneously supply power to more than a couple of PELs.

A technology that is capable of decomposing/decoupling power consumption of PELs by only measuring the aggregated electric signals at the wall outlet level is often desired as a cost-effective, nonintrusive load monitoring and identification (NILM) solution. An early example NILM apparatus and method is disclosed by U.S. Pat. No. 4,858,141.

Many researchers worldwide have been working toward a new generation of electricity measurement systems that are capable of providing disaggregated data about consumption at the individual appliance or device level. In general, the features and the disaggregation approaches that are used to monitor down to the appliance-level or the device-level can be categorized into three groups: (1) detecting the sharp changes in both the aggregate real and reactive power consumption; (2) current consumption and startup characteristics; and (3) voltage signatures.

Even though NILM technologies have been developed since the 1980s, no known commercially available disaggregation method is believed to be easily deployable, highly accurate, and cost effective. Most of the known methods require either an observation of hours or even longer, and some other methods require central processing units (CPUs) and operating systems to run artificial intelligence algorithms, which usually need an expensive platform to support the implementation.

There is room for improvement in methods of estimating power consumption of a plurality of electric loads.

There is also room for improvement in systems for estimating power consumption of a plurality of electric loads.

SUMMARY

These needs and others are met by embodiments of the disclosed concept which measure a plurality of samples for one line cycle of an aggregated current waveform and a voltage waveform for a plurality of electric loads powered by a single electrical outlet, transfer the measured samples for the one line cycle into an aggregated voltage-current trajectory for the single electrical outlet, and provide an instantaneous decomposition of power consumption for a plurality of different categories of the electric loads from the aggregated voltage-current trajectory for the one line cycle.

In accordance with one aspect of the disclosed concept, a method of disaggregating and estimating power consumption of a plurality of electric loads powered by a single electrical outlet comprises: measuring a plurality of samples for one line cycle of an aggregated current waveform and a voltage waveform for the plurality of electric loads powered by the single electrical outlet; transferring by a processor the measured samples for the one line cycle into an aggregated voltage-current trajectory for the single electrical outlet; and providing an instantaneous decomposition of power consumption for a plurality of different categories of the electric loads from the aggregated voltage-current trajectory for the one line cycle.

As another aspect of the disclosed concept, a system for disaggregating and estimating power consumption of a plurality of electric loads powered by a single electrical outlet comprises: a processor including a routine; a current sensor cooperating with the processor to measure a plurality of samples for one line cycle of an aggregated current waveform for the plurality of electric loads powered by the single electrical outlet; and a voltage sensor cooperating with the processor to measure a plurality of samples for the one line cycle of a voltage waveform for the plurality of electric loads powered by the single electrical outlet; wherein the routine of the processor is structured to transfer the measured samples for the one line cycle of the aggregated current waveform and the voltage waveform into an aggregated voltage-current trajectory for the single electrical outlet, and provide an instantaneous decomposition of power consumption for a plurality of different categories of the electric loads from the aggregated voltage-current trajectory for the one line cycle.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1A:
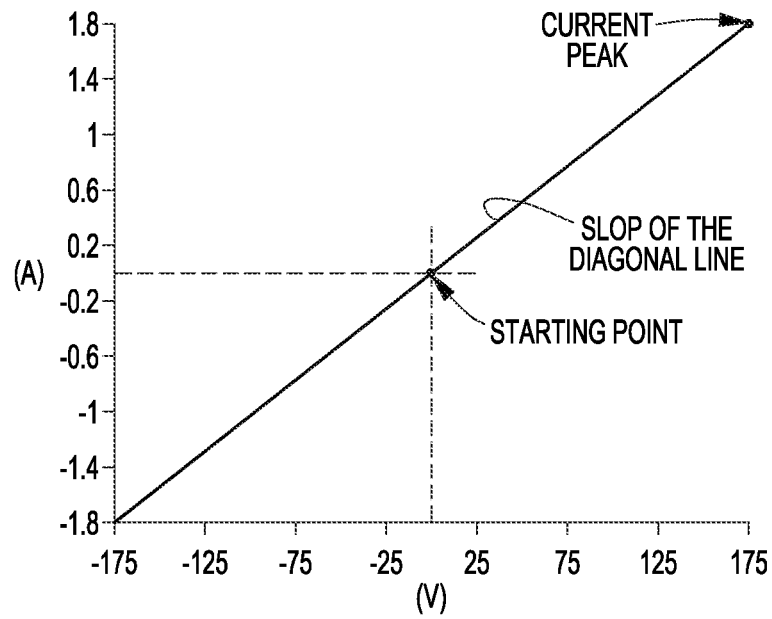
FIGS. 1A and 1B are plots of a voltage-current (V-I) trajectory, and voltage and current waveforms, respectively, for a resistive (R) load.
Figure 1B:
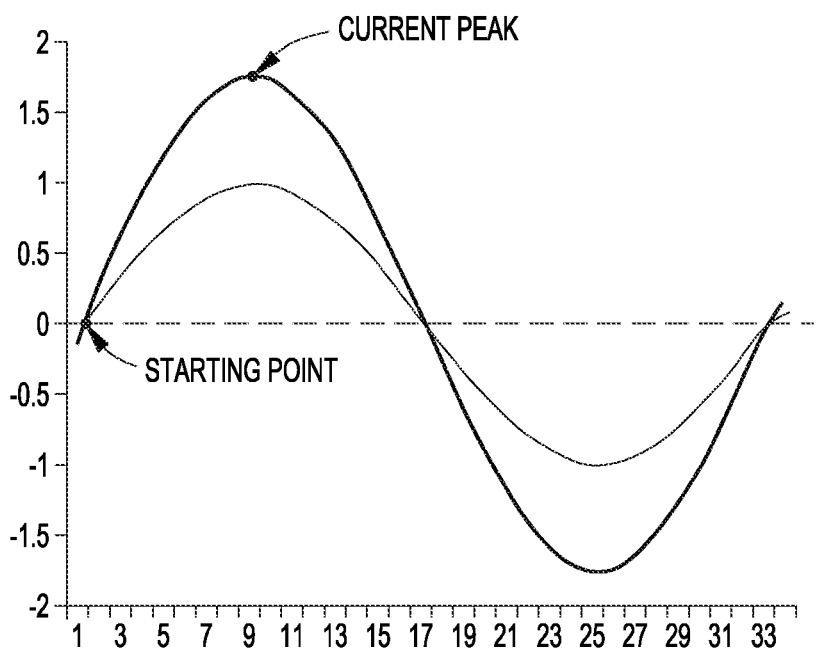

As employed herein, the term "number" shall mean one or an integer greater than one (i.e., a plurality).

As employed herein, the term "processor" shall mean a programmable analog and/or digital device that can store, retrieve, and process data; a computer; a digital signal processor; a controller; a workstation; a personal computer; a microprocessor; a microcontroller; a microcomputer; a central processing unit; a mainframe computer; a mini-computer; a server; a networked processor; or any suitable processing device or apparatus.

The disclosed concept employs an instantaneous decomposition approach by a graphical method to disaggregate and estimate the power consumption of multiple PELs by only measuring their aggregated current and voltage waveforms at a single electrical outlet (e.g., without limitation, at a wall outlet). This aims to achieve the instantaneous decomposition of energy consumption on a line cycle-by-cycle basis with a relatively low sampling rate (e.g., in the scale of a number of kHz). This enables a low-cost NILM solution that can easily be implemented in an embedded environment (e.g., without limitation, in a power strip powered from an electrical outlet; in an electrical outlet that powers a power strip).

U.S. patent application Ser. No. 13/912,819, filed Jun. 7, 2013, entitled "Method And System Employing Graphical Electric Load Categorization To Identify One Of A Plurality Of Different Electric Load Types" discloses a method and system employing graphical electric load categorization to identify and classify different electric loads. This extracts a plurality of different features from a mapped grid of cells as a graphical signature of a corresponding one of a plurality of different electric loads, derives a category of the corresponding one of the different electric loads from a hierarchical load feature database, and identifies one of a plurality of different electric load types for the corresponding one of the different electric loads. This approach disclosed in application Ser. No. 13/912,819 is based on the assumption that the voltage and current waveform measurement is available to or in connection with the individual PEL.

The concept disclosed herein extends the load categorization and feature extraction approach disclosed in application Ser. No. 13/912,819 to enable the disaggregation of the power consumption by individual electric loads plugged into a single electrical outlet. The disclosed concept assumes that there are only aggregated current and voltage measurements available at a single electrical outlet (e.g., without limitation, at a wall outlet; at the inlet entry to a power strip) that powers multiple downstream PELs. No known prior approach decomposes and estimates the instantaneous power consumption of PELs from aggregated current and voltage measurements.

If one line cycle of the voltage and current waveforms of an electric load are transformed directly into a corresponding voltage-current (V-I) trajectory (with no normalization), different categories of PELs possess quite different shapes and characteristics of the V-I trajectories. FIGS. 1A, 2A and 3A, 4A, 5A and 6A respectively show examples of V-I trajectories for five different load type categories: R (resistive load), two examples of X (reactive load), PAC (phase angle controlled load), P (electronic load with a power factor correction circuit), and NP (electronic load without a power factor correction circuit). The V-I trajectory X-axis represents the voltage value (volts) and the Y-axis represents the current value (amperes). FIGS. 1B-6B show the normalized value of the voltage waveform (shown in dotted line) and the actual value (amperes) of the current waveform (shown in solid line) for respective FIGS. 1A-6A. The normalized value of the voltage waveform is employed for ease of illustration and to improve legibility of FIGS. 1B-6B.

As an important observation of the instantaneous power consumption estimation, for each load category, the real power of a load can be estimated from several key characteristics extracted from the V-I trajectories. These characteristics are also named as the "defining features" that can help estimate the power consumption of the PEL under observation.

For an electric load in category R, the real power (P) (not to be confused with load category P), which equals the product of the RMS voltage ($V_{rms}$) and the RMS current ($I_{rms}$), is estimated from Equation 1.

$$P = V_{rms} \cdot I_{rms} \quad \text{(Eq. 1)}$$
$$\approx V_{peak}^2 \cdot \text{Slop}_{diag}/2$$

wherein:
$V_{peak}$ is the maximum value of the one line cycle of the voltage waveform;
$\text{Slop}_{diag}$ is the slope of the diagonal line of the V-I trajectory as shown in FIG. 1A (only for loads in category R) and can be calculated by $\text{Slop}_{diag}=I_k/V_k$;
($V_k$, $I_k$) represents any point along the V-I trajectory (i.e., any paired values of voltage and current samples within the one line cycle of the waveform);
k=1, 2, ... N; and
N is the number of samples per line cycle.

Figure 2A:
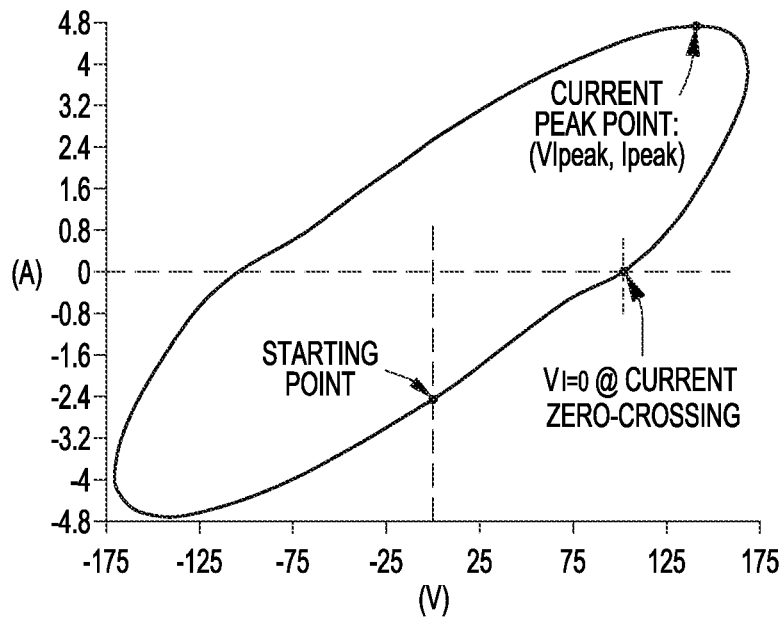
FIGS. 2A and 2B are plots of a V-I trajectory, and voltage and current waveforms, respectively, for a reactive (X) load.
Figure 2B:
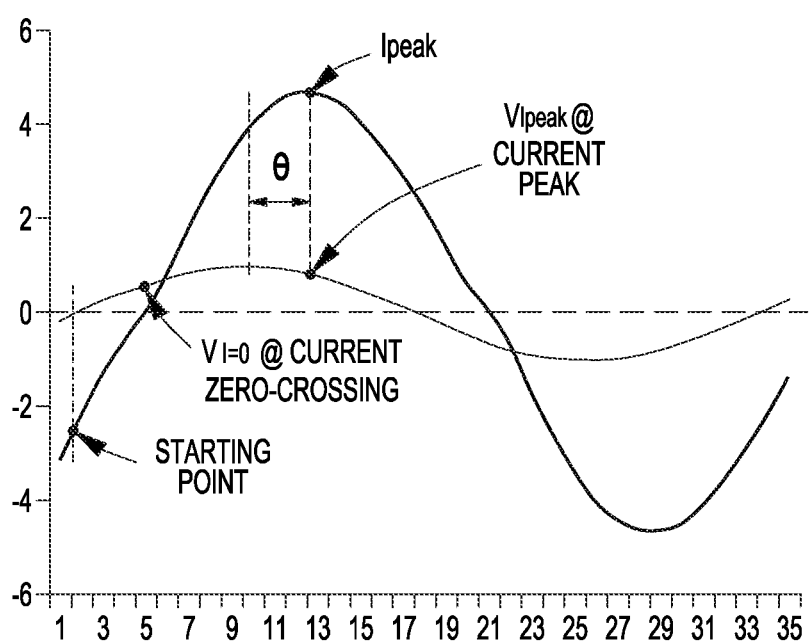

For an electric load in category X (case-1 of FIGS. 2A-2B), the real power is estimated from Equation 2.

$$P = V_{rms} \cdot I_{rms} \cdot \cos(\theta) \quad \text{(Eq. 2)}$$
$$\approx V_{peak} \cdot I_{peak} \cdot \cos(\theta)/2$$

wherein:
$V_{peak}$ is the maximum value of the one line cycle of the voltage waveform;
$I_{peak}$ is the maximum value of the one line cycle of the current waveform;
θ is the phase angle between the voltage and current waveforms as shown in FIG. 2B and (for the case-1 in category X) this phase angle can be estimated graphically from:

$$\theta_{case\_1} = \frac{\pi}{2} - a\cos\left(\frac{V_{I=0}}{V_{peak}}\right);$$

acos is arccosine; and
$V_{I=0}$ is the positive voltage value, when current/is zero, and is actually the X-axis value of the "current zero-crossing" point along the V-I trajectory as shown in FIG. 2A.

Figure 3A:
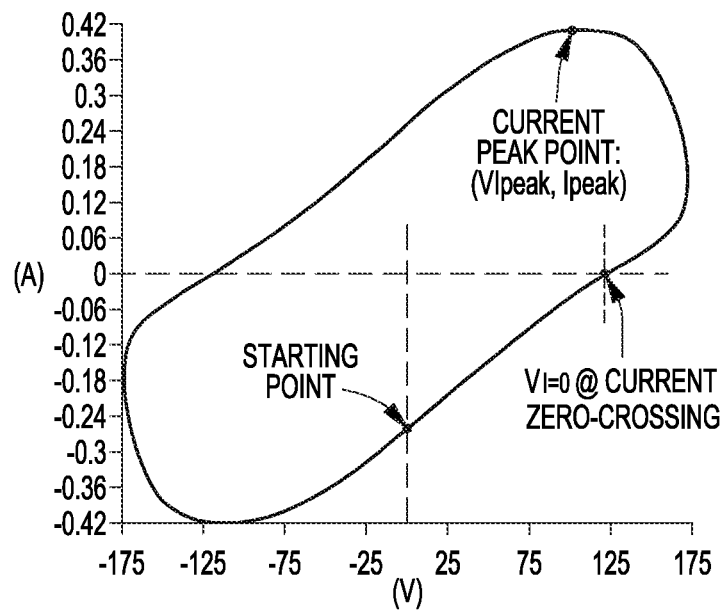
FIGS. 3A and 3B are plots of a V-I trajectory, and voltage and current waveforms, respectively, for another reactive (X) load.
Figure 3B:
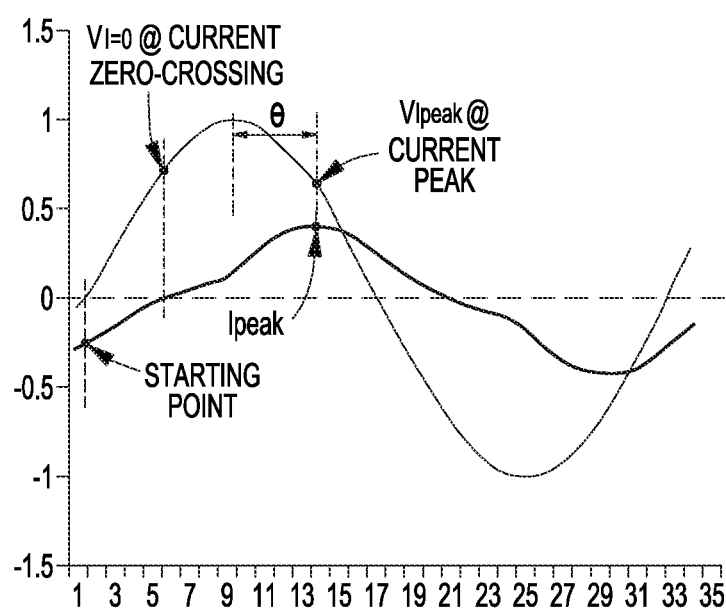

For an electric load in category X (case-2 of FIGS. 3A-3B), the real power is estimated from Equation 3.

$$P = V_{rms} \cdot I_{rms} \cdot \cos(\theta) \quad \text{(Eq. 3)}$$
$$\approx V_{peak} \cdot I_{peak} \cdot \cos(\theta)/2$$

wherein:
$V_{peak}$ is the maximum value of the one cycle of the voltage waveform;
$I_{peak}$ is the maximum value of the one cycle of the current waveform;
θ is the phase angle between the voltage and current waveforms as shown in FIG. 3B and (for the case-2 in category X) this phase angle can be estimated graphically from:

$$\theta_{case\_2} = a\cos\left(\frac{V_{Ipeak}}{V_{peak}}\right);$$

and
$V_{peak}$ is the positive voltage value, when the current/is at its peak value $I_{peak}$, and is actually the X-axis value of the "current peak" point along the V-I trajectory as is shown in FIG. 3A.

In order to estimate power consumption for category X loads, if the estimated phase angle is less than 30 degrees, the value ($\theta_{case\_1}$) derived from category X (case-1) is considered to be more accurate, and is adopted as the phase angle estimation. On the other hand, if the estimated phase angle is greater than 30 degrees, the value ($\theta_{case\_2}$) derived from category X (case-2) is considered to be more accurate, and a weighted average value of the results from case-1 and case-2 is adopted for the phase angle estimation as shown by Equation 4.

$$\theta \approx (\theta_{case\_1} + 2 \cdot \theta_{case\_2})/3 \quad \text{(Eq. 4)}$$

For an electric load in category PAC, the real power is estimated from Equation 5.

$$P = V_{rms} \cdot I_{rms} \cdot (\cos(\alpha)+1)/2 \quad ; \quad \text{(Eq. 5)}$$
$$\approx V_{peak} \cdot I_{peak} \cdot (\cos(\alpha)+1)/4$$

wherein:
$V_{peak}$ is the maximum value of the one line cycle of the voltage waveform;
$I_{peak}$ is the maximum value of the one line cycle of the current waveform;
α is the phase control angle (also known as the firing angle) as shown in FIG. 4B, which can be estimated graphically via the V-I trajectory from:

$$\alpha = \frac{\pi}{2} - a\cos\left(\frac{(V_{point\_1} - V_{point\_2})/2}{V_{peak}}\right);$$

Figure 4A:
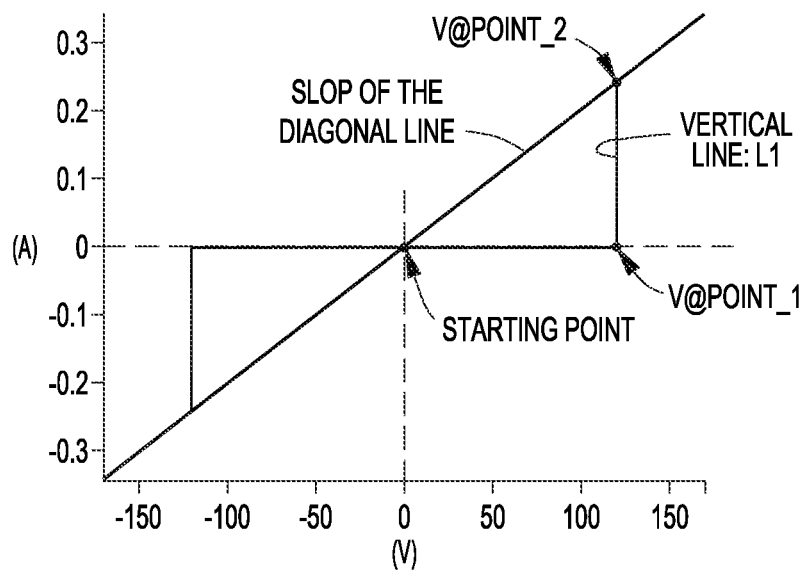
FIGS. 4A and 4B are plots of a V-I trajectory, and voltage and current waveforms, respectively, for a phase angle controlled (PAC) load.
Figure 4B:
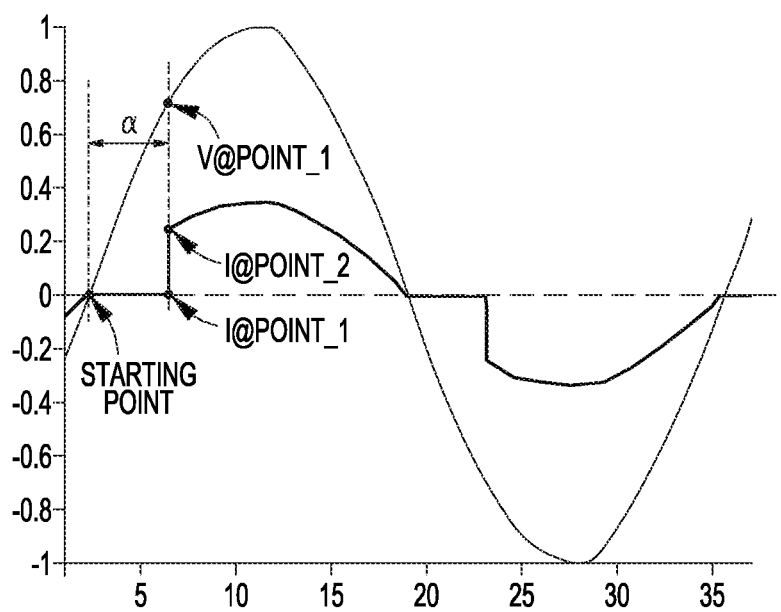

$V_{point\_1}$ and $V_{point\_2}$ are the voltage values (i.e., the X-axis values) of "Point_1" and "Point_2" that are located at the bottom and the top along a vertical line L1 in the V-I trajectory as shown in FIG. 4A;
the value of $I_{peak}$ can be estimated from:

$$I_{peak} \approx \Delta I_{point1-2}/\sin(\alpha); \text{ and}$$

$\Delta I_{point1-2} = I_{point\_2} - I_{point\_1}$ (i.e., the difference in Y-axis values between "Point_1" and "Point_2).

Figure 5A:
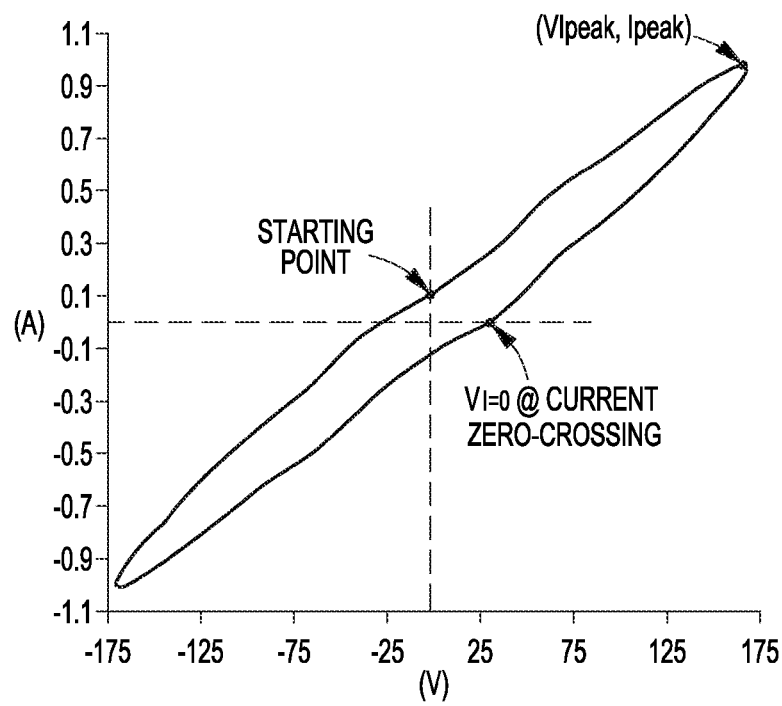
FIGS. 5A and 5B are plots of a V-I trajectory, and voltage and current waveforms, respectively, for an electronic load with a power factor correction circuit (P).
Figure 5B:
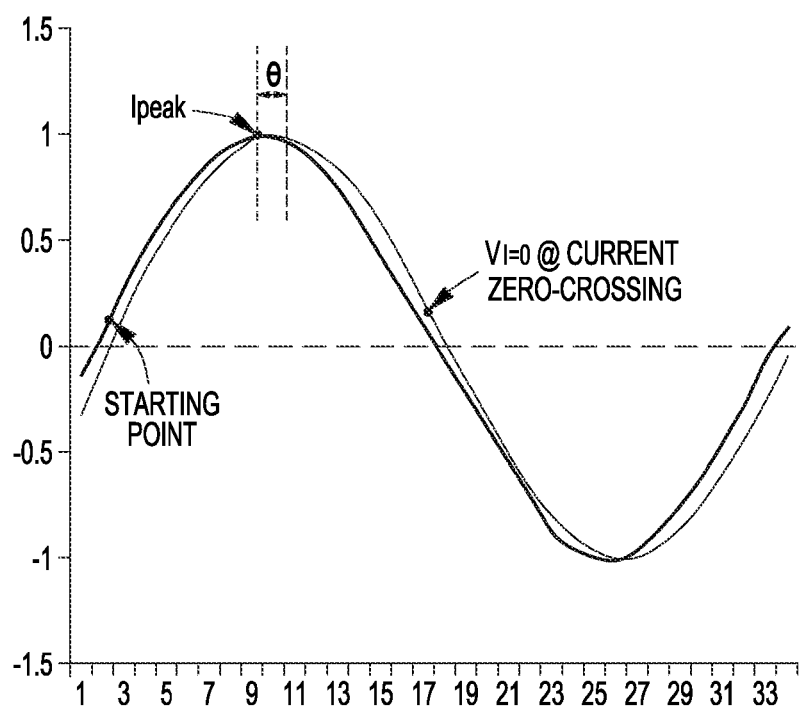

For an electric load in category P, the real power estimation is similar to category X (case-1) and is estimated from Equation 6.

$$P = V_{rms} \cdot I_{rms} \cdot \cos(\theta) \quad \text{(Eq. 6)}$$
$$\approx V_{peak} \cdot I_{peak} \cdot \cos(\theta)/2$$

wherein:
  $V_{peak}$ is the maximum value of the one line cycle of the voltage waveform;
  $I_{peak}$ is the maximum value of the one line cycle of the current waveform;
  θ is the phase angle between the voltage and current waveforms as shown in FIG. 5B and (for category P) this phase angle can be estimated graphically from:

$$\theta = a\cos\left(\frac{V_{I=0}}{V_{peak}}\right) - \frac{\pi}{2};$$

and
  $V_{I=0}$ is a positive voltage value, when the current/is zero, and is actually the X-axis value of the "current zero-crossing" point along the V-I trajectory as shown in FIG. 5A.

The difference between the category P loads and the two category X loads is that, for the category P loads, the current waveform leads the voltage waveform, which results in a negative value of the phase angle θ, as opposed to the positive value of the phase angle θ for the category X loads.

For an electric load in category NP, the analytical estimation of the real power is often challenging. This is mainly because of the uncertainty of the electronic components selection for the switching direct current (DC) power supply (often manufacturing dependent), such that the current waveform is difficult to be formulated through an analytical equation. For this power decomposition application, the power consumption estimation for NP loads is left as the last step of the power decomposition process, which is discussed, below, in connection with FIGS. 7A-7B, and with Tables 1-3 and the corresponding figures. This can be considered to be the remaining power consumption after all the other loads have been decoupled and estimated.

Figure 6A:
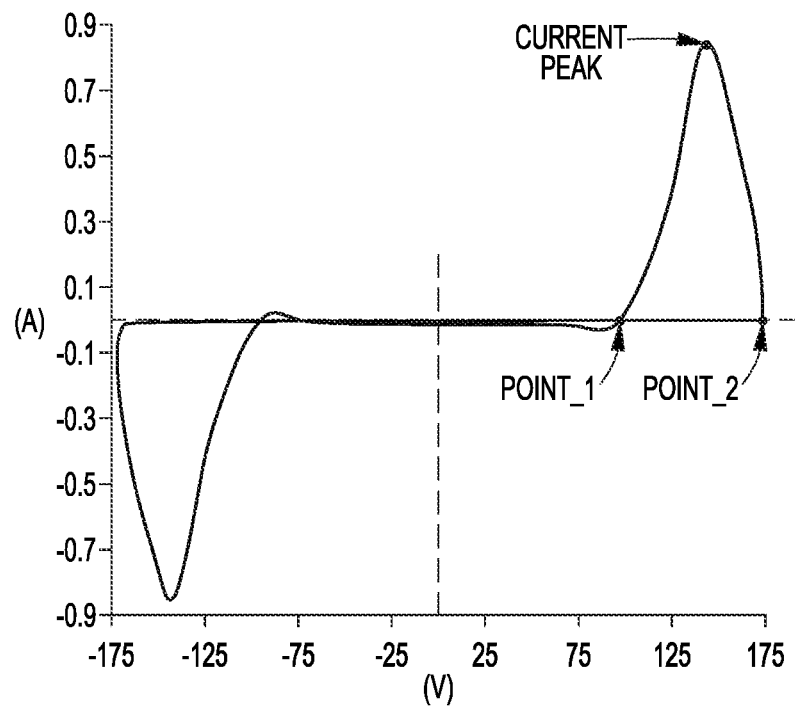
FIGS. 6A and 6B are plots of a V-I trajectory, and voltage and current waveforms, respectively, for an electronic load without a power factor correction circuit (NP).
Figure 6B:
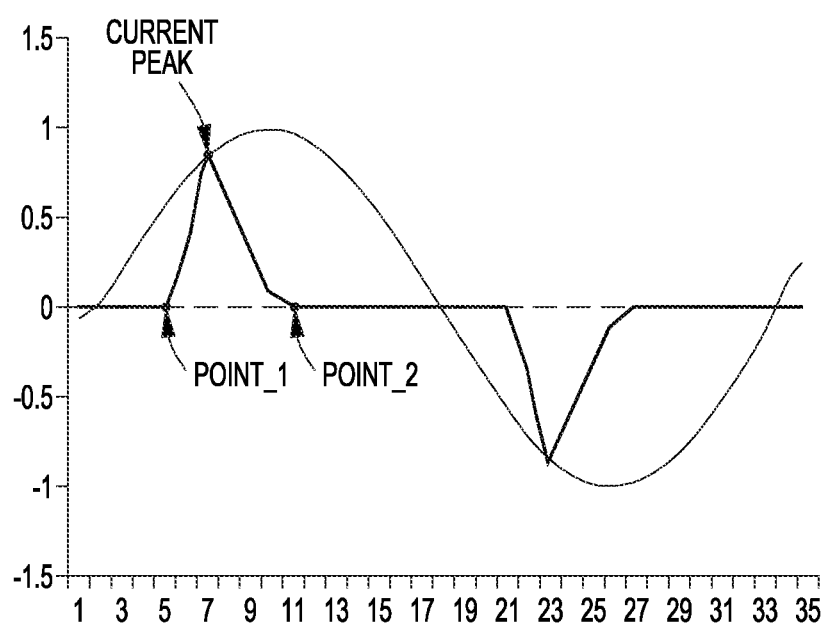

To further determine whether the remaining power consumption belongs to category NP, or a load category that cannot be properly defined, the level of current discontinuity can be used as a defining feature for category NP loads. As one of the most distinct features for category NP loads, the NP PELs' current is often highly discontinuous, where the load current remains to be zero or a very low current value (e.g., without limitation, less than 10% of $I_{peak}$) for a long duration within a cycle (e.g., without limitation, longer than 50% of a cycle duration). This duration is named as discontinued-current-duration. The level of current discontinuity can be evaluated via the following two conditions:

$$I_{Vk<30\% \cdot V_{peak}} < 10\% \cdot I_{peak}$$

$$(V_{point\_1} + V_{point\_2})/2 > 50\% \cdot V_{peak}$$

wherein:
  Point_1 and Point_2 are starting and terminal points, respectively, of the discontinued-current-duration, as shown in FIGS. 6A and 6B; and
  $I_{Vk<30\% \cdot V_{peak}}$ refers to the average current magnitude of data sample(s), when the corresponding voltage value(s) is(are) less than 30% of $V_{peak}$.

If both of the above two conditions are satisfied, the remaining power consumption is categorized into the NP category. Otherwise, it is categorized into a load category that cannot be properly defined, named as unknown category.

Instantaneous Power Decomposition and Estimation Process

When multiple PELs are powered simultaneously through one electrical outlet, the above "defining features" can still be applied to the aggregated waveforms (i.e., the aggregated V-I trajectories). The defining features for each of the above load categories can be used to reconstruct the waveforms of the individual loads of interest. These defining features for different load categories usually do not aggregate or have very limited overlap, and play important roles for decoupling the power consumption from the different load categories.

Figure 7A:
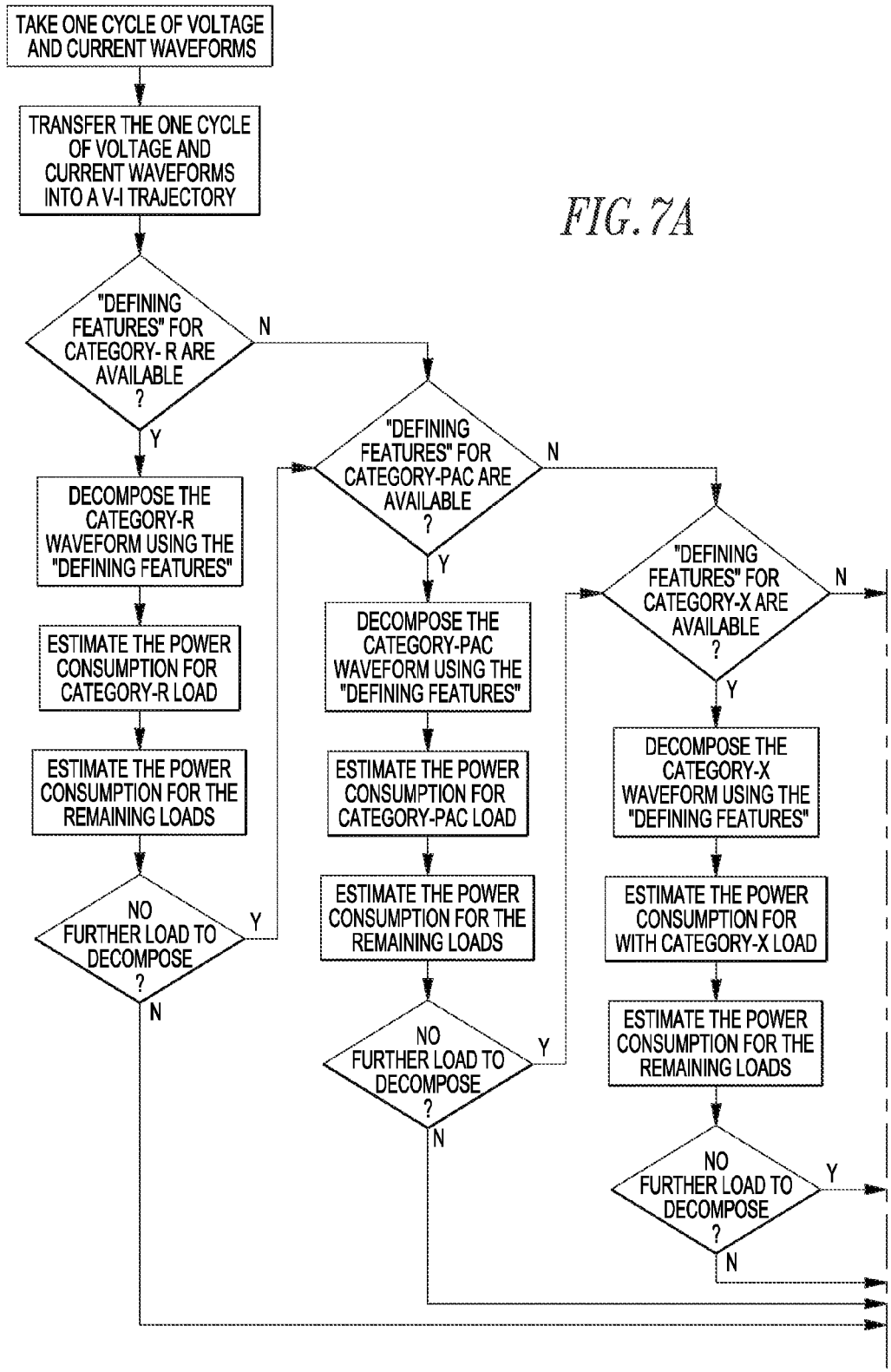
FIGS. 7A-7B form a flowchart of an instantaneous power decomposition and estimation routine in accordance with embodiments of the disclosed concept.
Figure 7B:
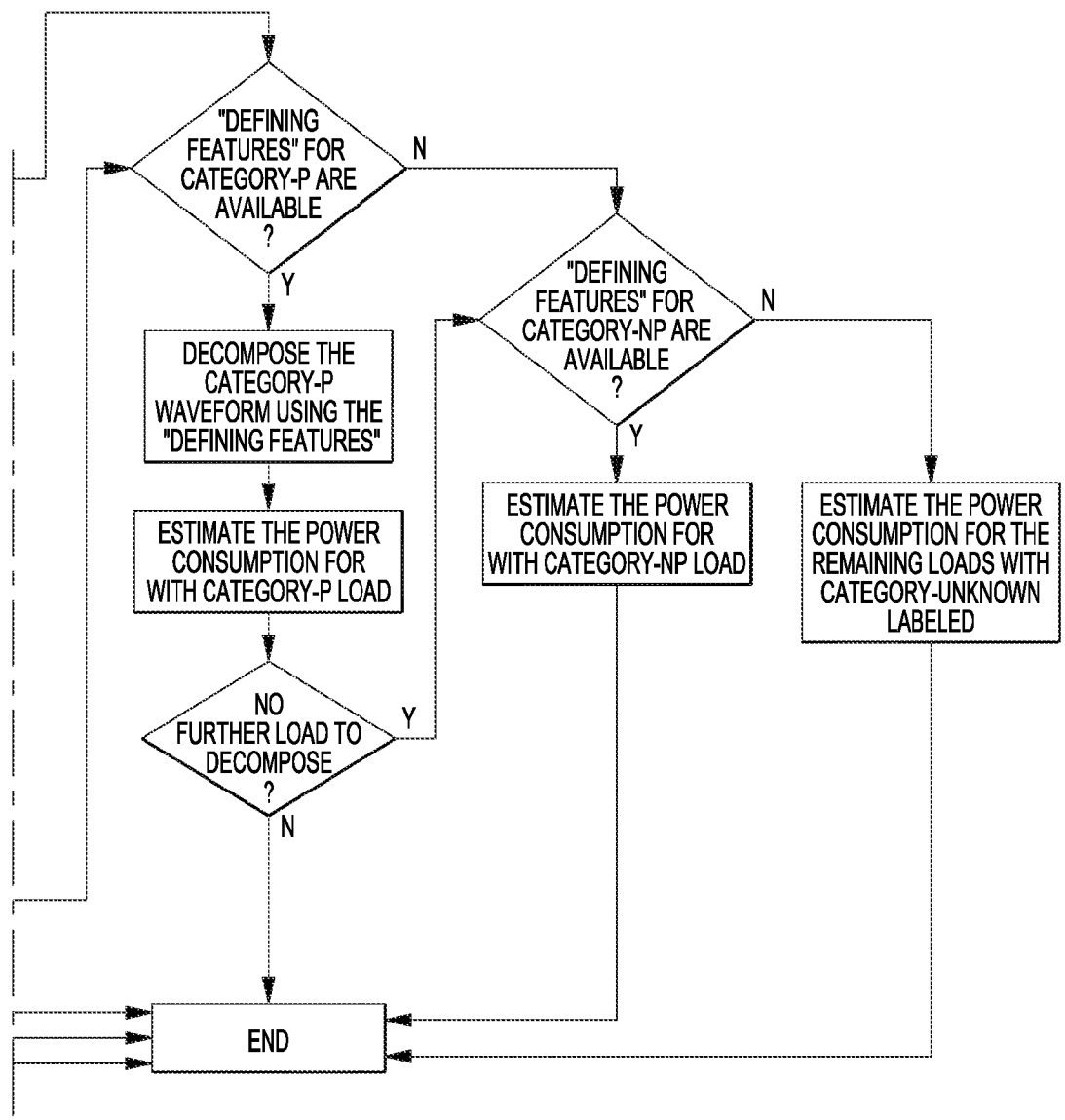
Figure 8A:
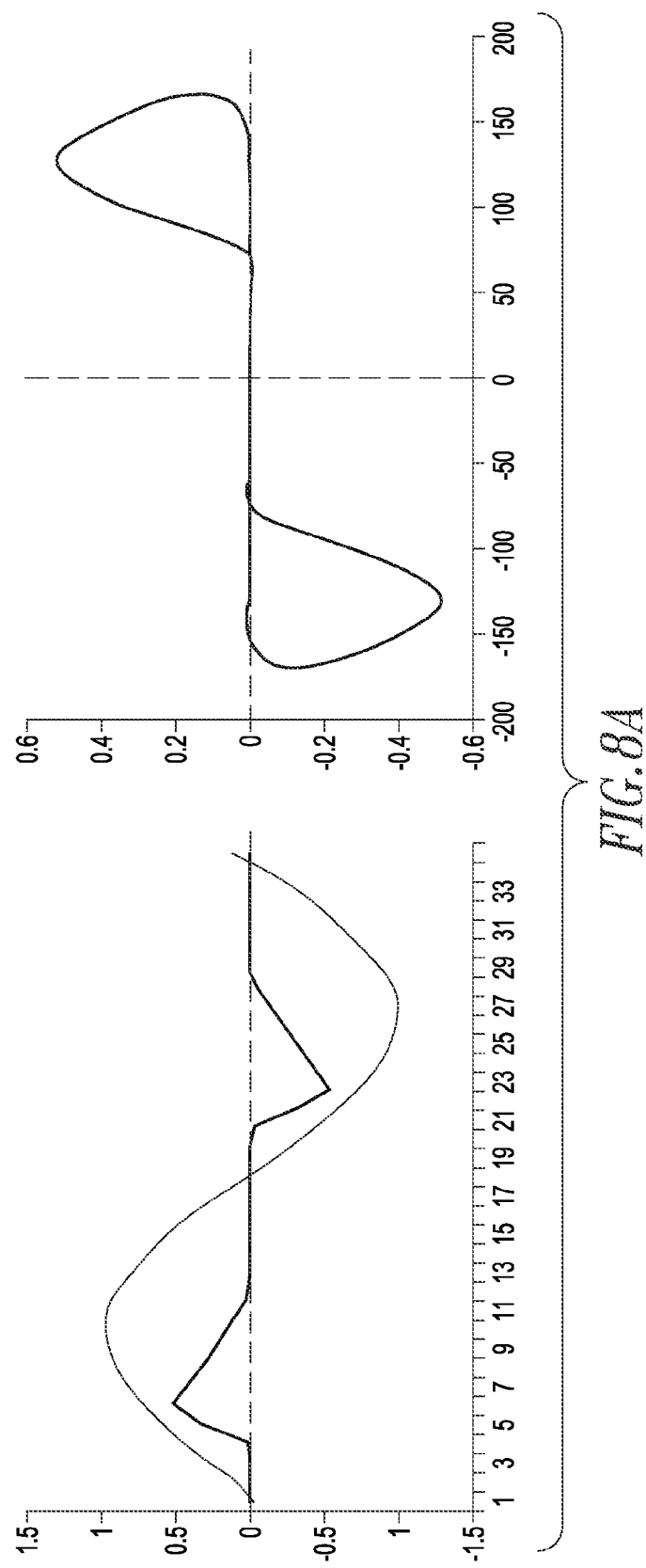
FIG. 8A are plots of voltage and current waveforms and a V-I trajectory for an LED lamp.
Figure 8B:
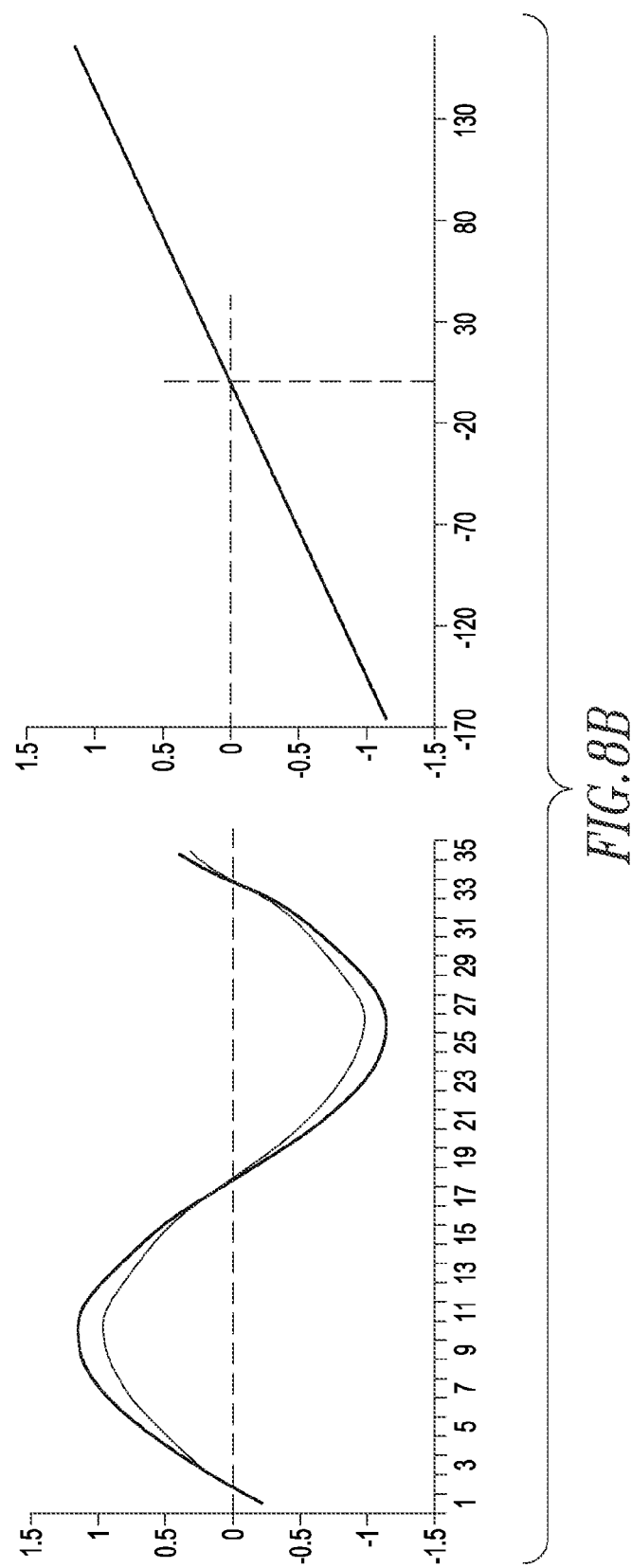
FIG. 8B are plots of voltage and current waveforms and a V-I trajectory for an incandescent lamp.
Figure 8C:
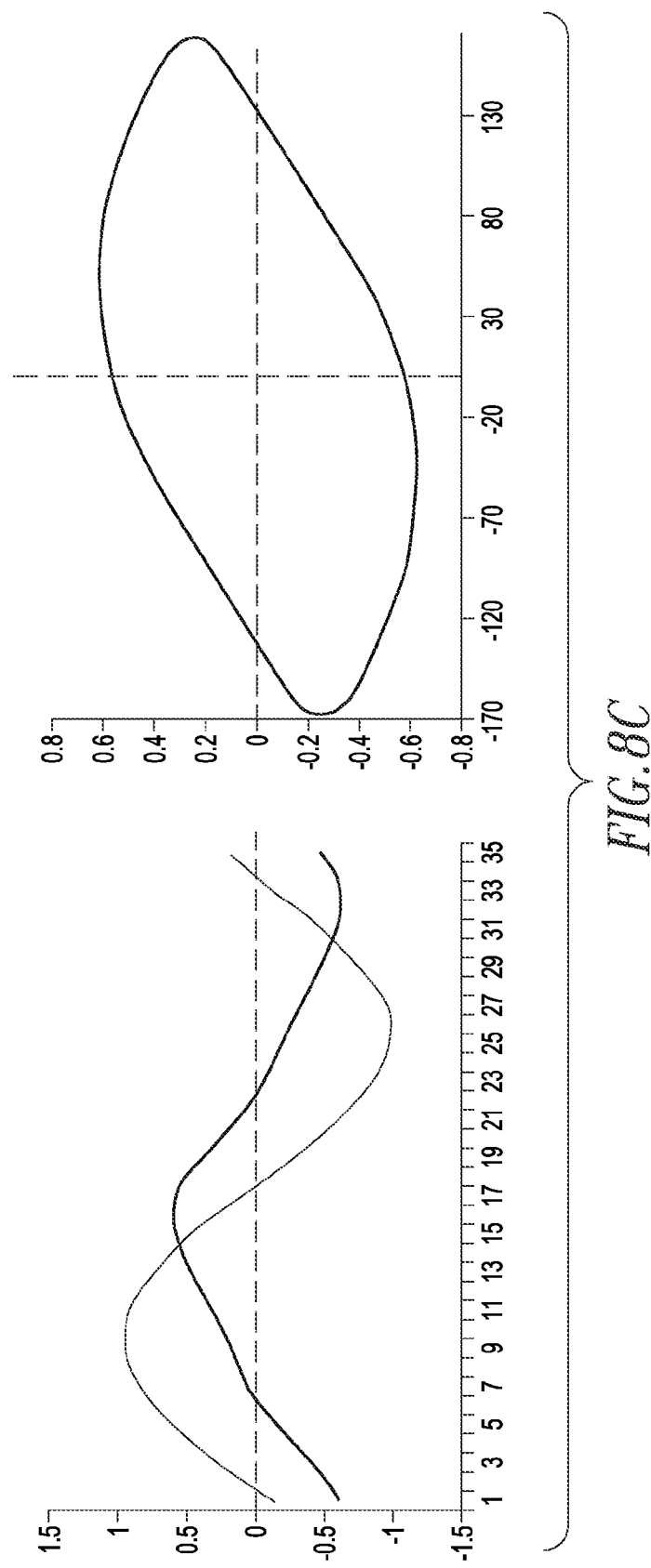
FIG. 8C are plots of voltage and current waveforms and a V-I trajectory for a space fan.
Figure 8D:
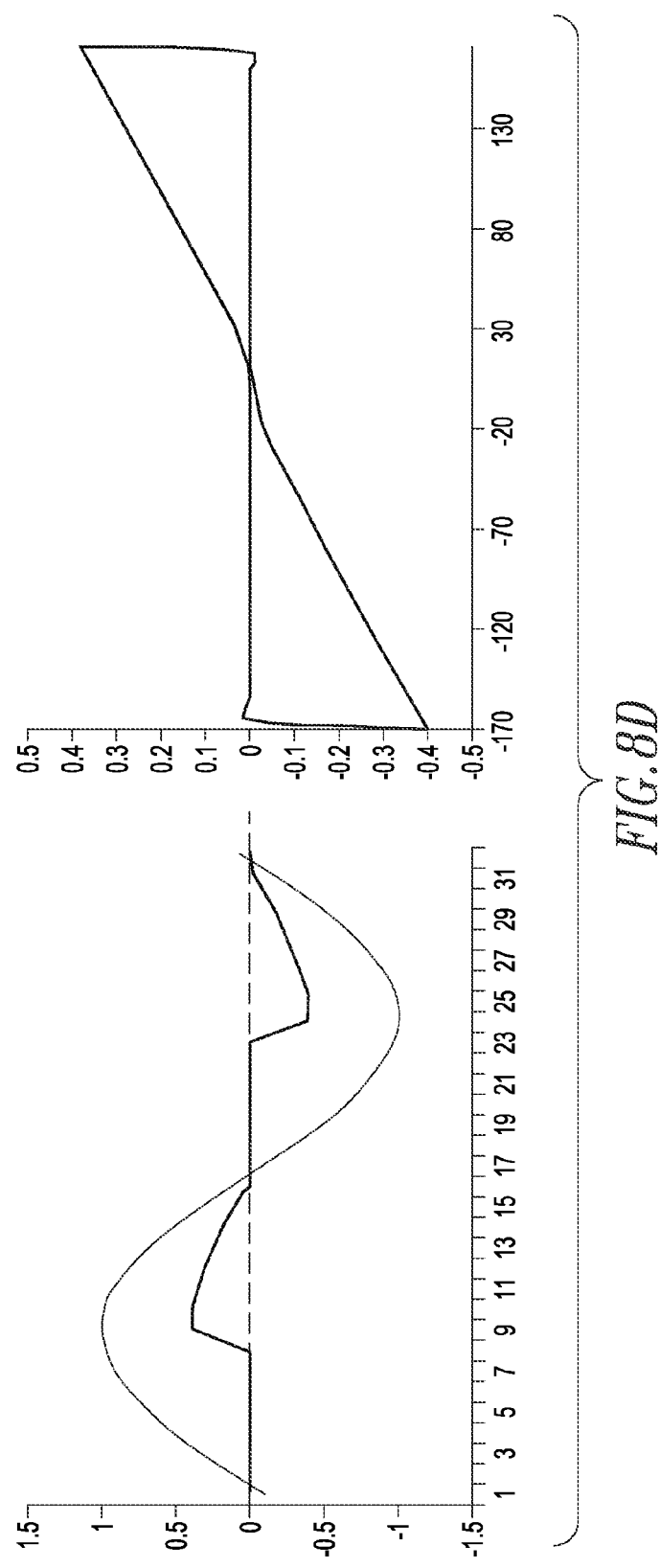
FIG. 8D are plots of voltage and current waveforms and a V-I trajectory for a dimmer lamp.

FIGS. 7A-7B show the process of instantaneous power decomposition and estimation. This process takes one line cycle of voltage and current waveforms at the single electrical outlet and transfers the one line cycle of these waveforms into an aggregated V-I trajectory. The process then determines in a hierarchical manner whether the defining features for categories R, PAC, X and P are available. If so, then the corresponding power consumption is estimated. If not, then the next load category is examined.

For example, for load category R, if the defining features for category R are available, then the category R waveform is decomposed using the defining features as were discussed, above, in connection with Equation 1. Then, the power consumption for the category R load(s) is estimated and the power consumption for the remaining load(s) is estimated (e.g., from the total power consumption based upon the one line cycle of voltage and current waveforms less the estimated power consumption for the category R load(s)). If there are no further loads to decompose (e.g., the power consumption for the remaining loads is about zero), then the routine exits.

Otherwise, if there are further loads to decompose (e.g., the power consumption for the remaining load(s) is greater than a predetermined value), then the routine decomposes the next category (e.g., PAC) waveform using the defining features as were discussed, above, in connection with Equation 5, in a similar manner as was discussed for the category R loads. The PAC category is then followed by the X category, which is followed by the P category.

After the P category, if there were no "defining features" for that category, or if there were further load(s) to decompose, then the power consumption for the remaining load(s) is estimated. If the "defining features" for category NP (i.e., the electronic load(s) without a power factor correction circuit) are available, the remaining power consumption is estimated for category NP load(s). Otherwise, the remaining power consumption is estimated for unknown category load(s).

Validation of Process

The following discusses various example tests conducted with different combinations of load appliances to validate the performance of the disclosed power decomposition and estimation process. These tests include combinations of four example types of PELs: (1) an LED lamp (an electronic NP load) (e.g., without limitation, actual power consumption=18.0 W); (2) an incandescent lamp (a resistive R load) (e.g., without limitation, actual power consumption=95.0 W); (3) a space fan (a reactive R load) (e.g., without limitation, actual power consumption=22.5 W); and (4) a dimmer lamp (a PAC load) (e.g., without limitation, actual power consumption=17.5 W). FIGS. 8A-8D show the current and voltage waveforms by the individual respective load appliances, as well as the corresponding V-I trajectories.

Test of Aggregated Waveforms with an LED Lamp and an Incandescent Lamp

Figure 9A:
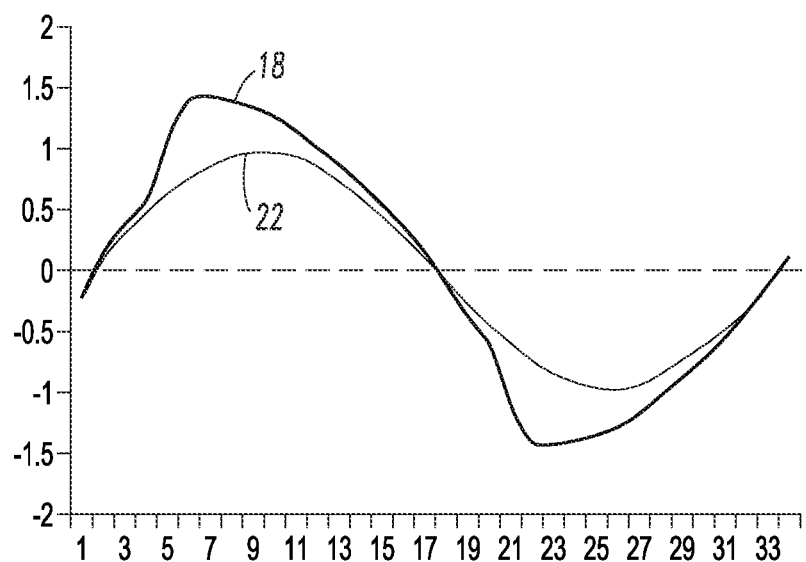
FIGS. 9A and 9B are plots of aggregated current and voltage waveforms, and a corresponding V-I trajectory, respectively, for a combined load including an LED lamp and an incandescent lamp in accordance with embodiments of the disclosed concept.
Figure 9B:
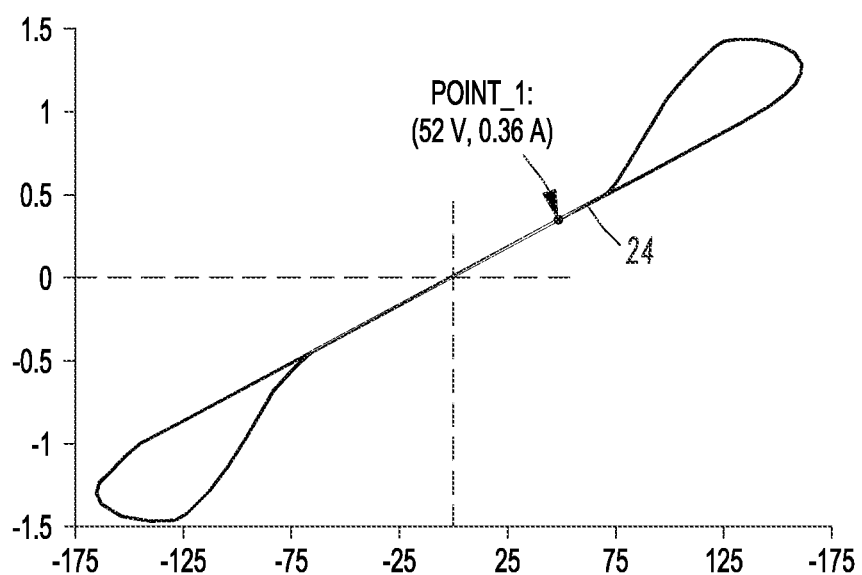

In this test, aggregated current and voltage waveforms are measured at one electrical outlet, when the LED lamp (electronic NP load) and the incandescent lamp (resistive R load) are powered simultaneously through this outlet. FIG. 9A shows the aggregated current and voltage waveforms 18,22, and FIG. 9B shows the corresponding V-I trajectory 24. In this example, the actual total power consumption is 113 W.

From FIGS. 7A-7B, the category R load is first considered. With reference to the defining features for loads in category R, the slope of the diagonal line segment shown in FIG. 9B is equal to $\text{Slop}_{diag}=0.36/52=0.0069$. The power consumption for the incandescent lamp is, then, estimated by:

$$P_{incandescent} \approx V_{peak}^2 \cdot \text{Slop}_{diag}/2$$
$$= 165^2 \cdot 0.0069/2$$
$$= 94.24 \text{ W}$$

The decomposed current waveform can also be reconstructed by:

$$I_{incandescent}(k) \approx V(k) \cdot \text{Slop}_{diag}$$

Figure 10A:
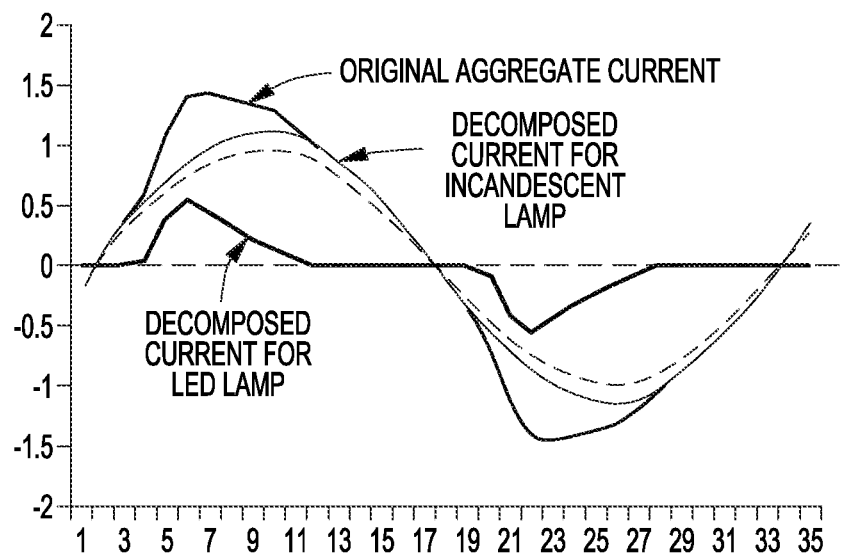
FIG. 10A is a plot of decomposed current waveforms and the original aggregated current for the combined load of FIGS. 9A and 9B.
Figure 10B:
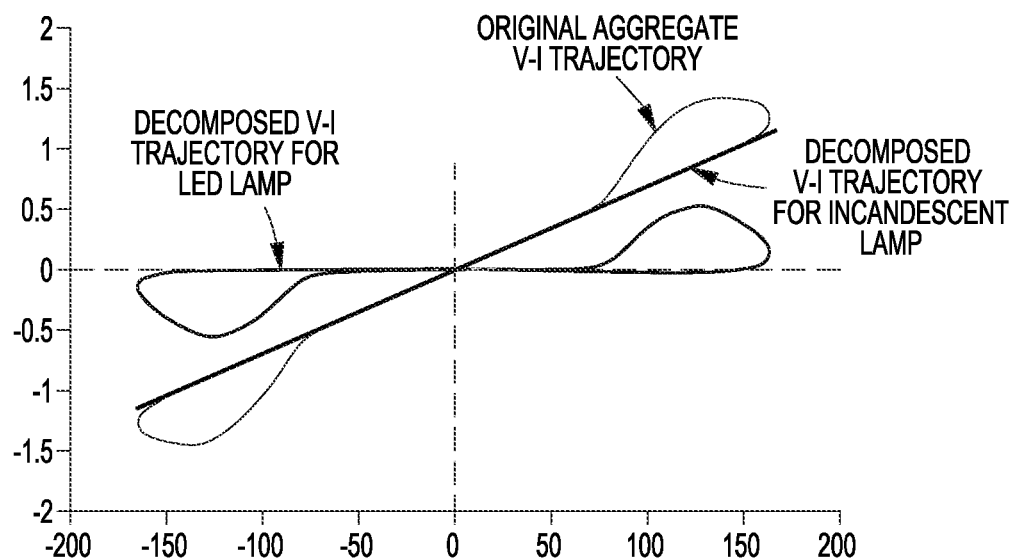
FIG. 10B is a plot of V-I trajectories for the combined load and the decomposed current waveforms of FIG. 10A.

FIG. 10A shows the original aggregated current waveform and the two decomposed current waveforms for the incandescent lamp and the LED lamp individually. FIG. 10B shows the original aggregate V-I trajectory and the two decomposed V-I trajectories. The remaining current waveform and V-I trajectory (i.e., subtracting the aggregated current and V-I trajectory by the decomposed incandescent lamp current waveform and V-I trajectory) present the distinct defining feature for category NP load(s), where the following two conditions are satisfied:

$$I_{Vk<30\% \cdot Vpeak} \approx 0.005 \text{ A} < 10\% \cdot I_{peak} = 0.05 \text{ A, and}$$

$$(V_{point\_1}+V_{point\_2})/2 = (85V+165V)/2 = 125V > 50\% \cdot V_{peak} = 165V/2 = 82.5V.$$

Therefore, the remaining power consumption can be categorized as category NP load(s). It can be seen by comparing these decomposed waveforms of FIGS. 10A and 10B to the actual waveforms as shown in FIGS. 1B,6B and 1A,6A, respectively, there is a promising match.

Table 1 summarizes the decomposed power consumption estimation for the incandescent lamp and the LED lamp of FIGS. 10A and 10B, as well as their actual individual power consumption. The estimated power consumptions match to their actual values (total actual power=113 W) with an accuracy greater than 95%.

TABLE 1

| Load | Actual Individual Power Consumption (W) | Estimated Individual Power Consumption (W) |
| --- | --- | --- |
| LED lamp | 18.0 | 18.71 |
| Incandescent lamp | 95.0 | 94.11 |

Test of Aggregated Waveforms with an LED Lamp and a Space Fan

Figure 11A:
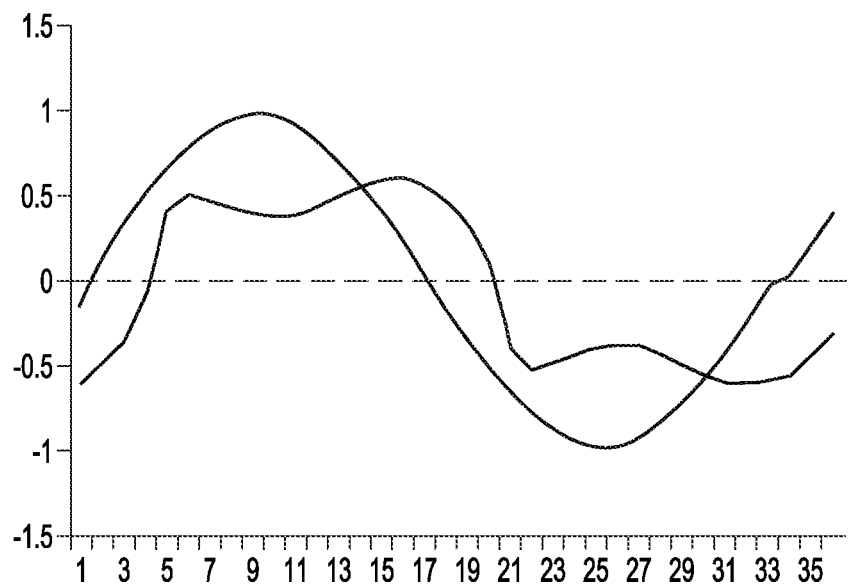
FIGS. 11A and 11B are plots of aggregated current and voltage waveforms, and a corresponding V-I trajectory, respectively, for a combined load including an LED lamp and a space fan in accordance with embodiments of the disclosed concept.
Figure 11B:
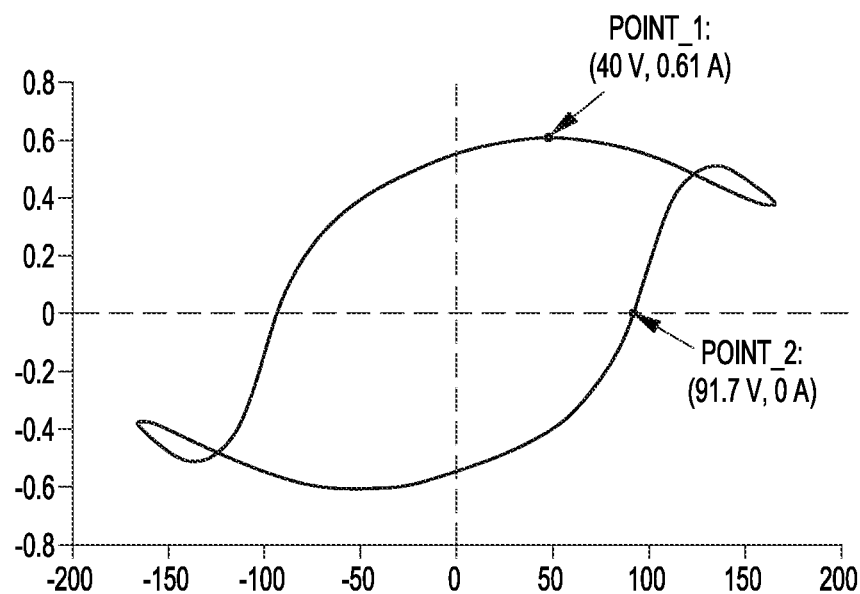

In this test, aggregated current and voltage waveforms are measured at one outlet, when the LED lamp (electronic NP load) and the space fan (reactive X load) are powered simultaneously through this outlet. FIG. 11A shows the aggregated current and voltage waveforms, and FIG. 11B shows the aggregated V-I trajectory. The actual total power consumption is 40.5 W.

From FIGS. 7A-7B, the category X load is first considered. With the reference to the defining features for loads in category X, as were discussed, above, in connection with Equation 2, the phase angle is estimated for case-1 by:

$$\theta = \frac{\pi}{2} - a\cos\left(\frac{91.7}{166}\right) = 0.59 \text{ rad.}$$

Also, the phase angle estimated for case-2, as was discussed, above, in connection with Equation 3, is given by:

$$\theta = a\cos\left(\frac{40}{166}\right) = 1.33 \text{ rad.}$$

Because the phase angle is larger than 30 degrees or $$\frac{\pi}{6},$$

the weighted average value of the results from case-1 and case-2 is adopted for the phase angle estimation using Equation 4, given by $\theta=(0.59+2*1.33)/3=1.1$ rad. The power consumption for the space fan is, then, estimated by:

$$P_{space\_fan} \approx V_{peak} \cdot I_{peak} \cdot \cos(\theta)/2$$
$$= 166 \cdot 0.61 \cdot \cos(1.1)/2$$
$$= 22.8 \text{ W.}$$

The decomposed current waveform can also be reconstructed by:

$$I_{incandescent}(k) \approx I_{peak} \cdot \sin(2\pi \cdot k/N - \theta).$$

Figure 12A:
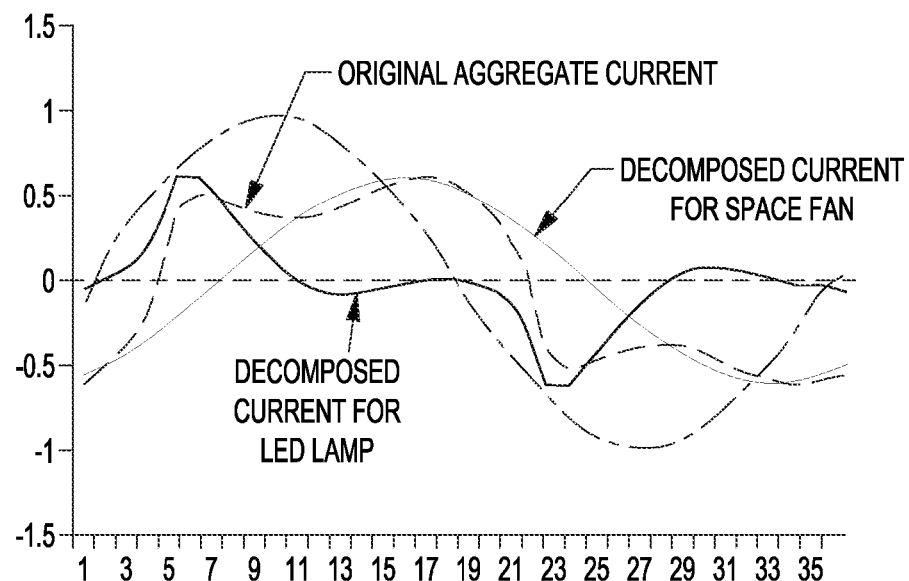
FIG. 12A is a plot of decomposed current waveforms and the original aggregated current for the combined load of FIGS. 11A and 11B.
Figure 12B:
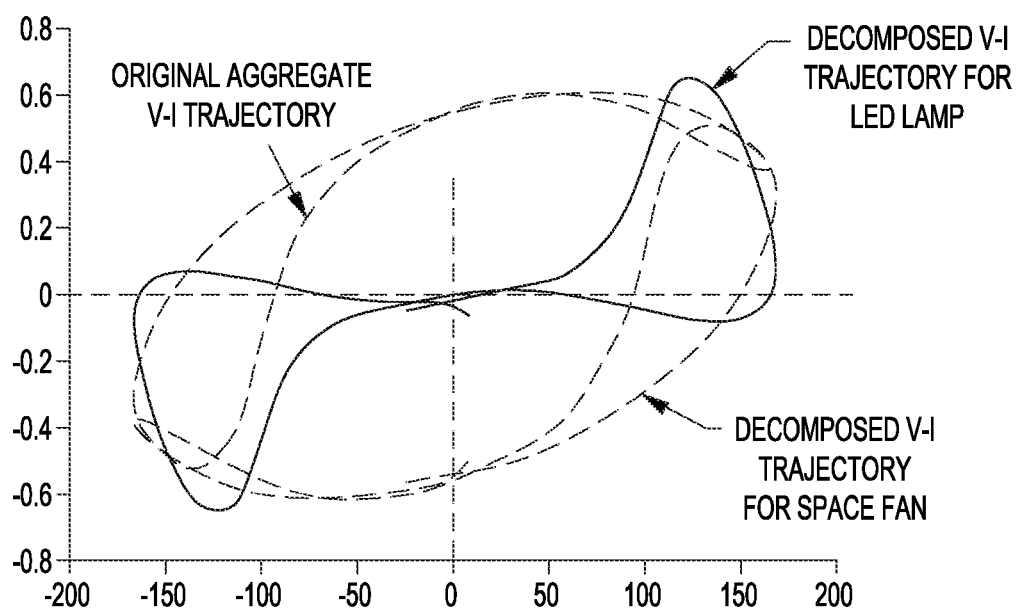
FIG. 12B is a plot of V-I trajectories for the combined load and the decomposed current waveforms of FIG. 12A.

FIG. 12A shows the original aggregated current waveform and the two decomposed current waveforms for the space fan and the LED lamp individually. FIG. 12B shows the original aggregated current V-I trajectory as well as the two decomposed V-I trajectories. The remaining current waveform and V-I trajectory (i.e., subtracting the aggregated current and V-I trajectory by the decomposed incandescent lamp current waveform and V-I trajectory) present the distinct defining feature for category NP load(s), where the following two conditions are satisfied:

$$I_{Vk<30\% \cdot Vpeak} \approx 0.05 \text{ A} < 10\% \cdot I_{peak} = 0.1 \cdot 0.6 \text{ A} = 0.06 \text{ A,}$$
and $$(V_{point\_1}+V_{point\_2})/2 = (50V+165V)/2 = 107V > 50\% \cdot V_{peak} = 165V/2 = 82.5V.$$

Therefore, the remaining power consumption can be categorized as category NP load(s). It can be seen by comparing these decomposed waveforms and V-I trajectories in FIGS. 12A and 12B to the actual waveforms and V-I trajectories as shown in FIGS. 3B,6B and 3A,6A, respectively, there is a promising match.

Table 2 summarizes the decomposed power consumption estimation for the LED lamp and the space fan of FIGS. 12A and 12B, as well as their actual individual power consumption. The estimated power consumptions match to their actual values (total actual power=40.5 W) with an accuracy greater than 95%.

TABLE 2

| Load | Actual Individual Power Consumption (W) | Estimated Individual Power Consumption (W) |
|---|---|---|
| LED lamp | 18 | 17.7 |
| Space fan | 22.5 | 22.8 |

Test of Aggregated Current with a Space Fan, LED Lamp and a Dimmer Lamp

Figure 13A:
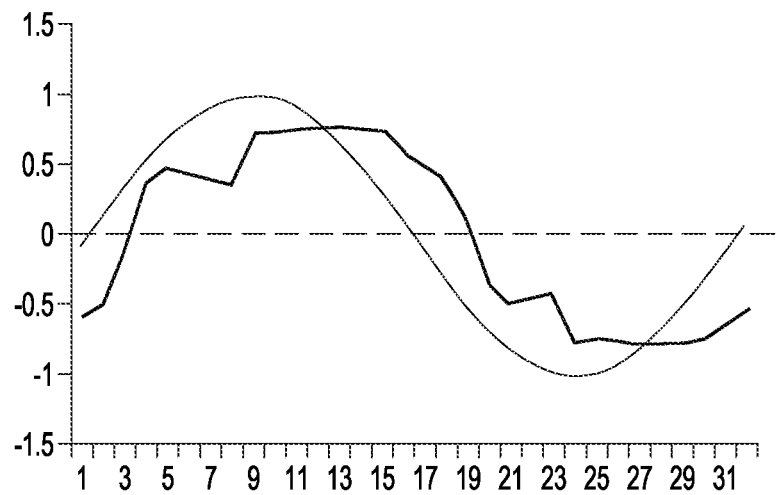
FIGS. 13A and 13B are plots of aggregated current and voltage waveforms, and a corresponding V-I trajectory, respectively, for a combined load including an LED lamp, a space fan and a dimmer lamp in accordance with embodiments of the disclosed concept.
Figure 13B:
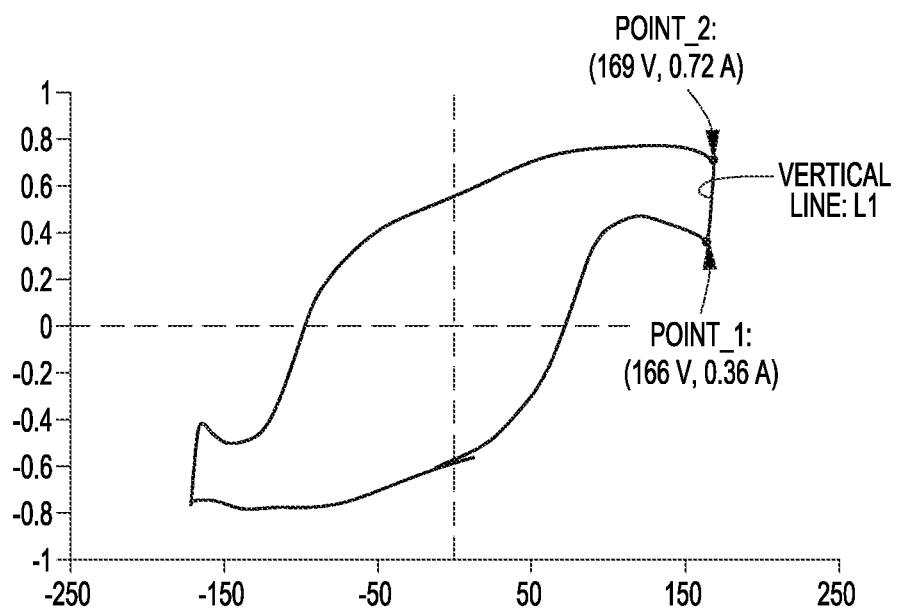

In this test, aggregated current and voltage waveforms are measured at one electrical outlet, when the LED lamp (electronic NP load), the space fan (reactive X load) and the dimmer lamp (phase angle controlled PAC load) are powered simultaneously through this outlet. FIG. 13A shows the aggregated current and voltage waveforms, and FIG. 13B shows the aggregated V-I trajectory. The actual total power consumption is 58.0 W.

From FIGS. 7A-7B, the category PAC load is first considered. With reference to the defining features for loads in category PAC, as were discussed, above, in connection with Equation 5, the firing angle can be estimated by:

$$\alpha = \frac{\pi}{2} - acos\left(\frac{167}{169}\right) = 1.42 \text{ rad.}$$

From FIGS. 7A-7B, the category X load is considered next. The current peak value can be estimated by:

$$I_{peak} \approx (0.72-0.36)/\sin(1.42) = 0.37 \text{ A.}$$

The power consumption for the dimmer lamp is, then, estimated by:

$$P \approx 169 \cdot 0.37 \cdot (\cos(1.42) + 1)/4$$
$$= 17.8 \text{ W}$$

The decomposed current waveform for the dimmer lamp (PAC load) can also be reconstructed based on the current peak value and the firing angle.

Figure 14A:
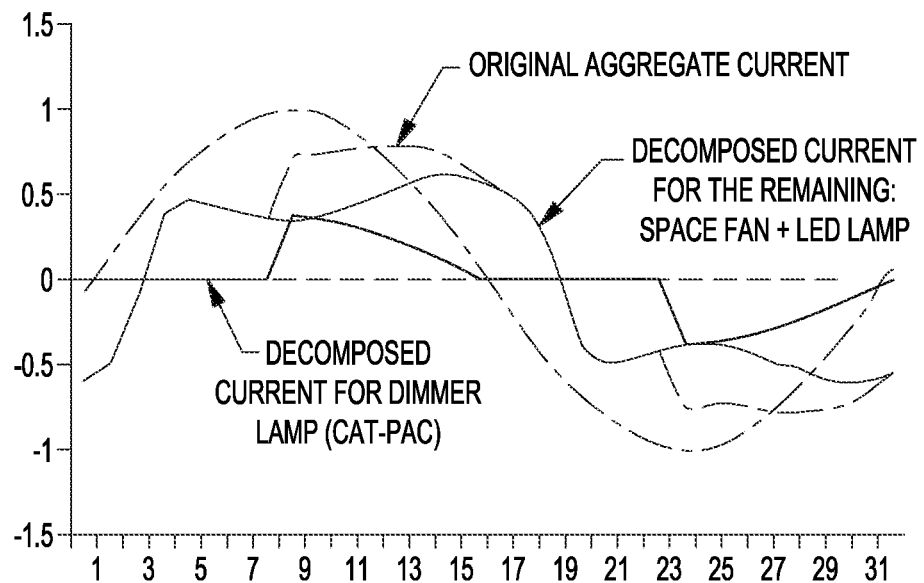
FIG. 14A is a plot of decomposed current waveforms and the original aggregated current for the combined load of FIGS. 13A and 13B.
Figure 14B:
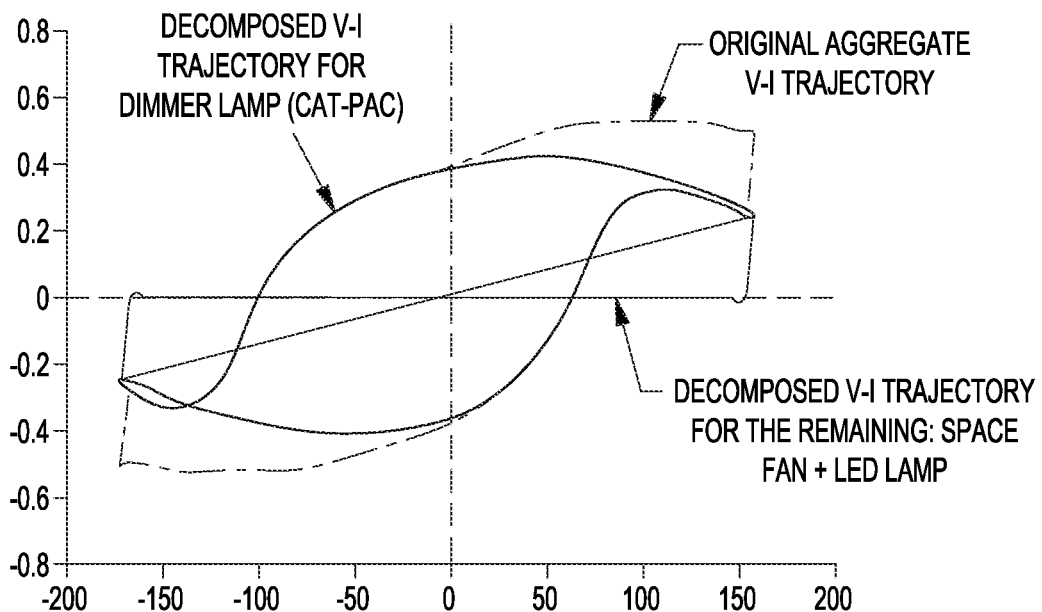
FIG. 14B is a plot of V-I trajectories for the combined load and the decomposed current waveforms of FIG. 14A.

FIG. 14A shows the original aggregated current waveform and the decomposed current waveforms for the dimmer lamp and the remaining two loads (i.e., the space fan and the LED lamp). FIG. 14B shows the original aggregated current V-I trajectory as well as the two decomposed V-I trajectories (i.e., for the dimmer lamp and the remaining two loads). It can be seen by comparing these decomposed waveforms and V-I trajectories of FIGS. 14A and 14B to the actual waveforms and V-I trajectories as shown in FIGS. 3B,4B,6B and 3A,4A,6A, respectively, there is a promising match.

For the further decomposition, the process is similar as what was described, above, with the previous test conducted for the space fan and the LED lamp. The details are not repeated, but only the decomposed power consumption results are presented.

Table 3 summarizes the decomposed power consumption estimation for these three loads of FIGS. 14A and 14B, as well as their actual individual power consumption. The estimated power consumptions match to their actual values (total actual power=58 W) with an accuracy greater than 95%.

TABLE 3

| Load | Actual Individual Power Consumption (W) | Estimated Individual Power Consumption Step-1 (W) | Estimated Individual Power Consumption Step-2 (W) |
|---|---|---|---|
| Dimmer lamp (PAC) | 17.5 | 17.8 | 17.8 |
| LED lamp (NP) | 18.0 | 40.2 | 17.7 |
| Space fan (X) | 22.5 | | 22.5 |

Figure 15:
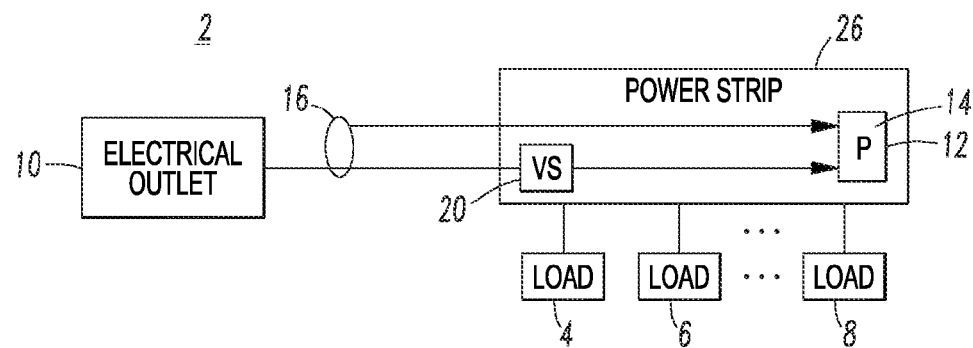
FIGS. 15 and 16 are block diagrams of systems in accordance with embodiments of the disclosed concept.

Referring to FIG. 15, a system 2 for disaggregating and estimating power consumption of a plurality of electric loads 4,6,8 (e.g., without limitation, PELs) powered by a single electrical outlet 10 is shown. Although three example electric loads are shown, the disclosed concept is applicable to any suitable plurality of electric loads. The system 2 includes a processor (P) 12 having a routine 14. A current sensor 16 cooperates with the processor 12 to measure a plurality of samples for one line cycle of an aggregated current waveform 18 (e.g., without limitation, as shown in FIG. 9A) for the electric loads 4,6,8. A voltage sensor (VS) 20 also cooperates with the processor 12 to measure a plurality of samples for the one line cycle of a voltage waveform 22 (e.g., without limitation, as shown in FIG. 9A) for the electric loads 4,6,8.

In accordance with the teaching of the disclosed concept, the processor routine 14 is structured to transfer the measured samples for the one line cycle of the aggregated current waveform 18 and the voltage waveform 22 into an aggregated voltage-current trajectory 24 (e.g., without limitation, as shown in FIG. 9B) for the single electrical outlet 10, and provide an instantaneous decomposition of power consumption for a plurality of different categories of the electric loads 4,6,8 from the aggregated voltage-current trajectory 24 for the one line cycle.

In the example of FIG. 15, the processor 12 is embedded in a power strip 26 powered by the electrical outlet 10.

Figure 16:
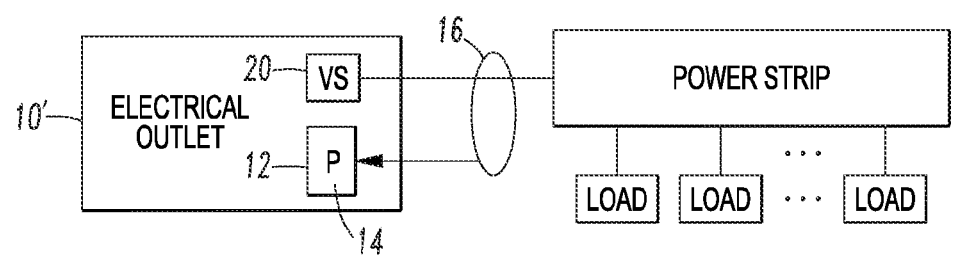

Alternatively, as shown in FIG. 16, the processor 12 is embedded in the electrical outlet 10'.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of disaggregating and estimating power consumption of a plurality of electric loads powered by a single electrical outlet, the plurality of electric loads including electric loads from a plurality of different categories of electric loads, said method comprising:
   measuring a plurality of samples for one line cycle of an aggregated current waveform and a voltage waveform for said plurality of electric loads powered by said single electrical outlet;
   transferring by a processor said measured samples for said one line cycle into an aggregated voltage-current trajectory for said plurality of electric loads powered by said single electrical outlet;
   decomposing the aggregated voltage-current trajectory into a plurality of decomposed voltage-current trajectories each corresponding to one of the plurality of different categories of electric loads; and estimating power consumption for each different category of electric load powered by the single electrical outlet based on the decomposed voltage-current trajectories.

2. The method of claim 1 further comprising:

employing as said different categories of said electric loads resistive loads, phase angle controlled loads, reactive loads, and electronic loads with a power factor correction circuit; and hierarchically determining whether defining features for said resistive loads, said phase angle controlled loads, said reactive loads, and said electronic loads with the power factor correction circuit are available in the aggregated voltage-current trajectory.

3. The method of claim 2 further comprising:

starting said hierarchically determining with said resistive loads, determining that the defining features for a number of said resistive loads are available in the aggregated voltage-current trajectory and responsively decomposing the aggregated voltage-current trajectory into a first decomposed voltage-current trajectory corresponding to the resistive loads category of said electric loads using the last said defining features; and estimating power consumption for the number of said resistive loads and estimating power consumption for a number of remaining loads powered by said single electrical outlet for said phase angle controlled loads, said reactive loads, and said electronic loads with the power factor correction circuit.

4. The method of claim 3 further comprising:

employing said different categories of said electric loads further including electronic loads without a power factor correction circuit;

hierarchically determining power consumption of said number of remaining loads starting with said phase angle controlled loads, followed by said reactive loads, and followed by said electronic loads with the power factor correction circuit; and finally estimating power consumption of a number of said electronic loads without the power factor correction circuit based upon a level of current discontinuity in the aggregated voltage-current trajectory.

5. The method of claim 3 further comprising:

employing said different categories of said electric loads further including electronic loads without a power factor correction circuit and unknown electric loads;

hierarchically determining power consumption of said number of remaining loads starting with said phase angle controlled loads, followed by said reactive loads, and followed by said electronic loads with the power factor correction circuit; and finally estimating power consumption of a number of said unknown electric loads based upon a level of current discontinuity in the aggregated voltage-current trajectory.

6. The method of claim 1 further comprising:

sampling said aggregated current and voltage waveforms at a rate of about a number of kilohertz per each sample of said aggregated current and voltage waveforms.

7. The method of claim 1 further comprising:

estimating power consumption of a number of resistive loads powered by said single electrical outlet from:

$$V_{peak}^2 \times Slop_{diag}/2;$$

employing $V_{peak}$ as a maximum value of the sampled voltage waveform;

employing $Slop_{diag}$ as a slope of a diagonal line of the aggregated voltage-current trajectory calculated by $Slop_{diag} = I_k/V_k$;

employing $(V_k, I_k)$ as any point along the aggregated voltage-current trajectory;

employing $k = 1, 2, \ldots N$; and employing N as a number of samples for each of the aggregated current and voltage waveforms per said one line cycle.

8. The method of claim 1 further comprising:

estimating power consumption of a number of reactive loads from:

$$V_{peak} \cdot I_{peak} \cdot \cos(\theta)/2;$$

employing $V_{peak}$ as a maximum value of the sampled voltage waveform;

employing $I_{peak}$ as a maximum value of the sampled aggregated current waveform;

employing $\theta$ as a phase angle between the voltage and aggregated current waveforms;

estimating $\theta$ graphically from:

$$\frac{\pi}{2} - a\cos\left(\frac{V_{I=0}}{V_{peak}}\right);$$

and employing $V_{I=0}$ as a positive voltage value, when a corresponding current value is zero.

9. The method of claim 1 further comprising:

estimating power consumption of a number of reactive loads from:

$$V_{peak} \cdot I_{peak} \cdot \cos(\theta)/2;$$

employing $V_{peak}$ as a maximum value of the sampled voltage waveform;

employing $I_{peak}$ as a maximum value of the sampled aggregated current waveform;

employing $\theta$ as a phase angle between the voltage and aggregated current waveforms;

estimating $\theta$ graphically from:

$$a\cos\left(\frac{V_{Ipeak}}{V_{peak}}\right);$$

and employing $V_{Ipeak}$ as a positive voltage value, when a corresponding current value is maximum.

10. The method of claim 9 further comprising:

estimating $\theta$ to be less than 30 degrees;

estimating $\theta$ graphically from:

$$\frac{\pi}{2} - a\cos\left(\frac{V_{I=0}}{V_{peak}}\right);$$

and employing $V_{I=0}$ as a positive voltage value, when a corresponding current value is zero.

11. The method of claim 9 further comprising:
estimating θ to be greater than 30 degrees; and
determining a weighted average value of θ from:

$$\left(\left(\frac{\pi}{2} - a\cos\left(\frac{V_{I=0}}{V_{peak}}\right)\right) + 2\left(a\cos\left(\frac{V_{Ipeak}}{V_{peak}}\right)\right)\right)/3;$$

and
employing $V_{I=0}$ as a positive voltage value, when a corresponding current value is zero.

12. The method of claim 1 further comprising:
estimating power consumption of a number of phase angle controlled loads from:

$$V_{peak} \cdot I_{peak} \cdot (\cos(\alpha)+1)/4;$$

employing $V_{peak}$ as a maximum value of the sampled voltage waveform;
employing $I_{peak}$ as a maximum value of the sampled aggregated current waveform;
employing α as a phase control angle estimated graphically employing the aggregated voltage-current trajectory from:

$$\frac{\pi}{2} - a\cos\left(\frac{(V_{point\_1} + V_{point\_2})/2}{V_{peak}}\right);$$

employing $V_{point\_1}$ and $V_{point\_2}$ as voltage values of two points located at a bottom and a top along a vertical line in the aggregated voltage-current trajectory;
estimating $I_{peak}$ from:

$$\Delta I_{point\ 1-2}/\sin(\alpha);\ \text{and}$$

employing $\Delta I_{point\ 1-2} = I_{point\_2} - I_{point\_1}$ as the difference of current values of said two points.

13. The method of claim 1 further comprising:
estimating power consumption of a number of electric loads with a power factor correction circuit from $$V_{peak} \cdot I_{peak} \cdot \cos(\theta)/2;$$

employing $V_{peak}$ as a maximum value of the sampled voltage waveform;
employing $I_{peak}$ as a maximum value of the sampled aggregated current waveform;
employing θ as a phase angle between the voltage and aggregated current waveforms;
estimating θ graphically from:

$$a\cos\left(\frac{V_{I=0}}{V_{peak}}\right) - \frac{\pi}{2};$$

and
employing $V_{I=0}$ as a positive voltage value, when a corresponding current value is zero.

14. The method of claim 13 further comprising:
employing a negative value of θ.

15. The method of claim 8 further comprising:
employing a positive value of θ.

16. The method of claim 9 further comprising:
employing a positive value of θ.

17. The method of claim 1 further comprising:
employing a wall outlet as said single electrical outlet.

18. The method of claim 1 further comprising:
embedding said processor in a power strip powered by said single electrical outlet.

19. The method of claim 1 further comprising:
embedding said processor in said single electrical outlet.

20. The method of claim 4 further comprising:
causing said finally estimating the power consumption of the number of said electronic loads without the power factor correction circuit when the following two conditions are met:

$$I_{Vk<30\%Vpeak} < 10\% \cdot I_{peak}, \text{and}$$

$$(V_{point\_1} + V_{point\_2})/2 > 50\% \cdot V_{peak};$$

employing Point_1 and Point_2 as starting and terminal points, respectively, of a duration of discontinuous current of said aggregated voltage-current trajectory;
employing $I_{peak}$ as a maximum value of the sampled aggregated current waveform;
employing $V_{peak}$ as a maximum value of the sampled voltage waveform; and
employing $I_{Vk<30\%Vpeak}$ as an average current magnitude of a number of samples of current values of said sampled aggregated current waveform when a corresponding number of samples of voltage values of said sampled voltage waveform are less than 30% of $V_{peak}$.

21. A system for disaggregating and estimating power consumption of a plurality of electric loads powered by a single electrical outlet, the plurality of electric loads including electric loads from a plurality of different categories of electric loads, said system comprising:
a processor including a routine;
a current sensor cooperating with said processor to measure a plurality of samples for one line cycle of an aggregated current waveform for said plurality of electric loads powered by said single electrical outlet; and
a voltage sensor cooperating with said processor to measure a plurality of samples for said one line cycle of a voltage waveform for said plurality of electric loads powered by said single electrical outlet;
wherein the routine of said processor is structured to:
transfer the measured samples for said one line cycle of the aggregated current waveform and the voltage waveform into an aggregated voltage-current trajectory for said plurality of electric loads powered by said single electrical outlet,
decomposed the aggregated voltage-current trajectory into a plurality of decomposed voltage-current trajectories each corresponding to one of the plurality of different categories of electric loads, and
estimate power consumption for each different category of electric load powered by the single electrical outlet based on the decomposed voltage-current trajectories.

22. The system of claim 21 wherein said processor is embedded in a power strip powered by said single electrical outlet.

23. The system of claim 21 wherein said processor is embedded in said single electrical outlet.

* * * * *